(12) United States Patent
Sugaya et al.

(10) Patent No.: US 6,507,431 B1
(45) Date of Patent: *Jan. 14, 2003

(54) REMOTELY PUMPING TYPE MULTI-WAVELENGTH LIGHT TRANSMISSION SYSTEM

(75) Inventors: Yasushi Sugaya, Kawasaki (JP); Terumi Chikama, Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/264,903

(22) Filed: Mar. 9, 1999

Related U.S. Application Data

(62) Division of application No. 08/955,439, filed on Oct. 21, 1997, now Pat. No. 5,903,385.

(30) Foreign Application Priority Data

Mar. 13, 1997 (JP) .............................. 9-058826

(51) Int. Cl.[7] .......................... H04B 10/17; G02B 6/28; H01S 3/14
(52) U.S. Cl. .................. 359/341.32; 359/160; 359/179; 359/341.3
(58) Field of Search ................................ 359/115, 124, 359/160, 177, 179, 337, 341, 341.3, 341.32

(56) References Cited

U.S. PATENT DOCUMENTS

| | | | |
|---|---|---|---|
| 5,185,814 A | 2/1993 | Healy | 385/24 |
| 5,264,404 A | 11/1993 | Yamane et al. | |
| 5,321,707 A | 6/1994 | Huber | |
| 5,323,474 A | 6/1994 | Hornung et al. | |
| 5,416,864 A | 5/1995 | Connolly et al. | |
| 5,500,764 A | 3/1996 | Armitage et al. | 359/341 |
| 5,510,926 A * | 4/1996 | Bayart et al. | 359/179 |
| 5,561,553 A | 10/1996 | Macerou et al. | |
| 5,699,081 A * | 12/1997 | Denkin et al. | 359/160 |
| 5,764,404 A * | 6/1998 | Yamane et al. | 359/341 |
| 6,108,123 A * | 8/2000 | Kinoshita | 359/337 |

FOREIGN PATENT DOCUMENTS

| | | | |
|---|---|---|---|
| EP | 0637148 | * | 2/1995 |
| GB | 2244595 | | 12/1991 |
| GB | 2294170 | | 4/1996 |
| JP | 404009929 | | 1/1992 |
| JP | 4-121715 | | 4/1992 |
| JP | 4-361583 | | 12/1992 |
| JP | 7-143072 | | 6/1995 |
| JP | 8-95097 | | 4/1996 |
| JP | 8-204647 | | 8/1996 |

OTHER PUBLICATIONS

Yamada et al, IEEE Photonics Tech. Lett., vol. 2, #3, Mar. 1990, pp. 205–207, Mar. 1990.*
Hansen et al, 21st European Conf. in Opt. Comm. vol. 2, pp. 565–8, Sep. 17, 1995; abst. only herewith.*
Terahara et al., OSA Trends in Optical Photonics, vol. 5, pp. 302–305, Jul. 13, 1996, Abstract.
Naito et al., Conf. on Opt. Fiber Comm., 1997, OSA, vol. 6, pp. 45–46, Feb. 21, 1997, Abstract.
Terahara, Takafumi et al. "WDM Transmission Experiments over 2640 km of Eight NRZ, 10–Gb/s Data Channels". Technical Digest. Summaries of Papers Presented at the Topical Meeting "Optical Amplifiers and their Applications", Jul. 11–13, 1996, Monterey, California. pp. 10–13.
Naito, Takao et al. "128–Gbits/WDM transmission of 24 5.3–Gbit/s RZ signals over 7828 km using gain equalization to compensate for asymmetry In EDFA gain characteristics". Technical Digest. Conference on Optical Fiber Communications, Feb. 16–21, 1997 Dallas Convention Center, Dallas, Texas. 1997 OSA Technical Digest Series, vol. 6, pp. 45–46.

* cited by examiner

*Primary Examiner*—Nelson Moskowitz
(74) *Attorney, Agent, or Firm*—Staas & Halsey LLP

(57) ABSTRACT

Multi-wavelength light is transmitted from a sending station to a receiving station. An erbium-doped optical fiber is installed on the transmission path that connects the sending station and the receiving station. Pump light is supplied from a light source installed in the receiving station to the erbium-doped optical fiber. In the receiving station, the multi-wavelength light is decomposed into the component wavelength signals. The light level of each component wavelength signal is detected, and the power of the light emitted by the light source is controlled so as to equalize those light levels.

13 Claims, 26 Drawing Sheets

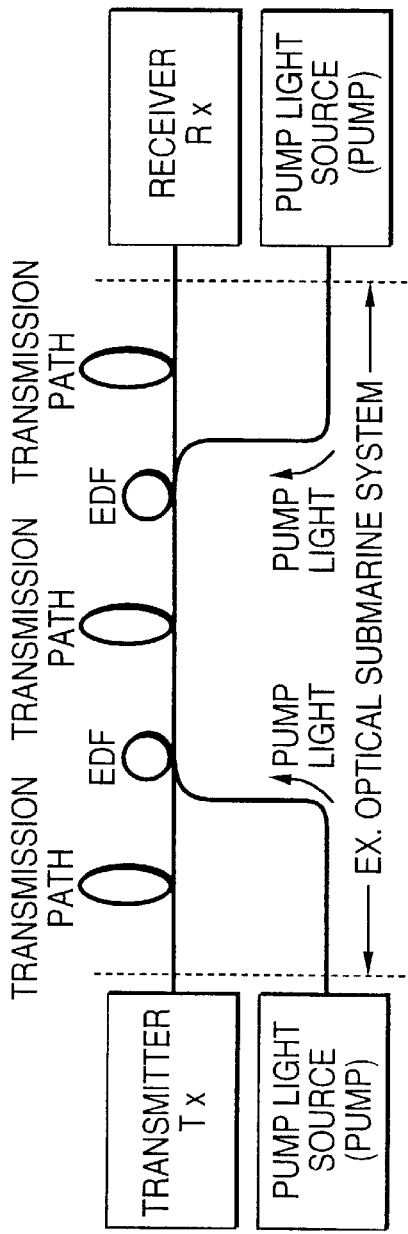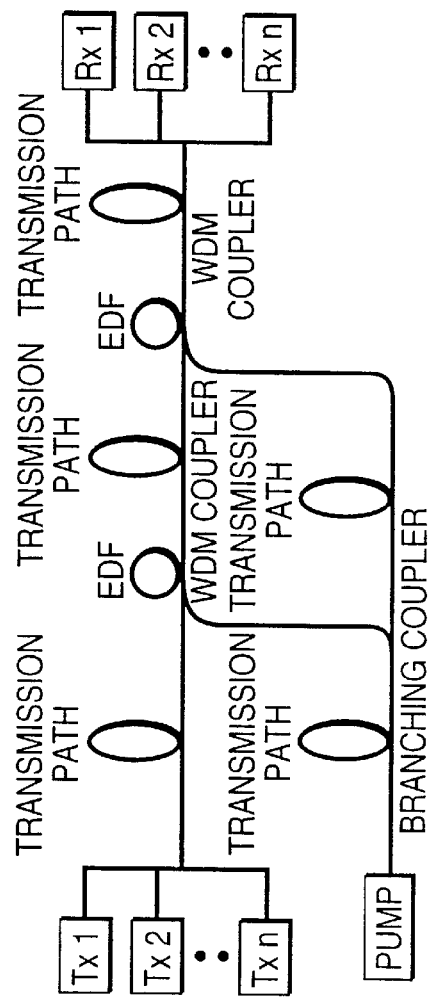

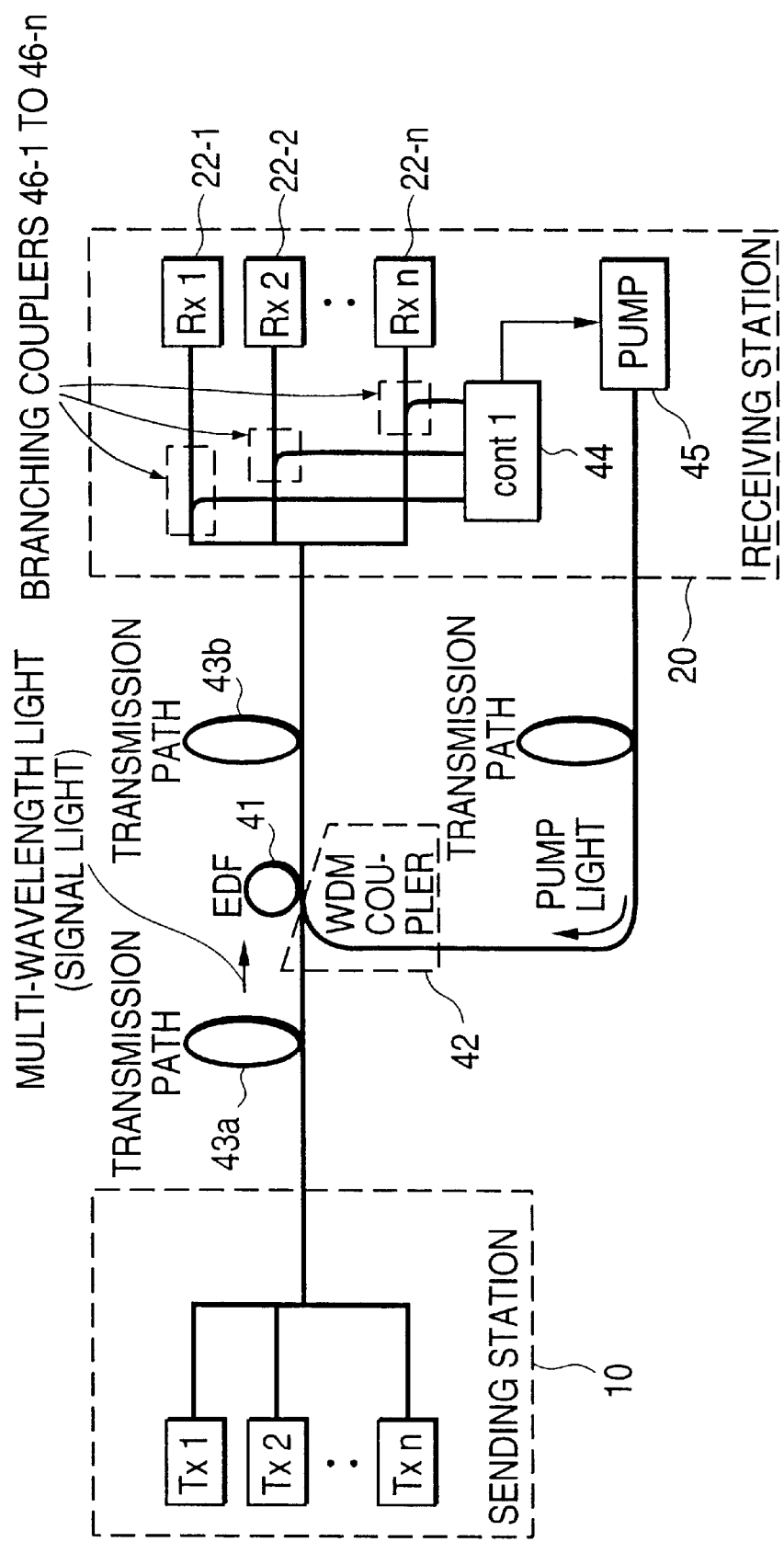

REMOTELY PUMPING TYPE MULTI-WAVELENGTH LIGHT TRANSMISSION SYSTEM

This application is a division of Ser. No. 08/955,439 filed Oct. 21, 1997, now U.S. Pat. No. 5,903,385.

BACKGROUND OF THE INVENTION

1. Field of the Invention

This invention relates to a system for remote control of an amplifier that amplifies multi-wavelength light in a system that transmits multi-wavelength light. In particular, it relates to a remote pump system for an optical fiber amplifier.

2. Description of the Related Art

In the advanced information society that has developed in recent years, optical fiber has become widely used in transmission paths to transmit information. Optical fiber not only makes it possible to transmit larger amounts of data at higher speed, but also is superior in long-distance transmission.

However, even in optical fiber that is superior for long-distance transmission, the signal that is transmitted through the optical fiber attenuates as the transmission path becomes longer. For this reason, in, for example, a long-distance optical transmission system that connects cities or continents, normally relay nodes are established at specified intervals; at each relay node the signal is amplified and sent on to the next relay node.

A variety of types of optical amplifiers have been developed to amplify light signals. One of them is known as the optical fiber amplifier. In particular, in the 1.55 micrometer wavelength band, rare earth-doped optical fiber amplifiers into which a rare earth substance such as erbium has been injected are widely used. In a rare earth-doped optical fiber amplifier, the rare earth substance that has been injected into the optical fiber is raised to the excited state by pump light that is input separately from the signal light, and the signal light is amplified by that pump energy.

When data are transmitted between continents, particularly in high-speed communication, ocean floor cables are usually used. These ocean floor cables are normally optical fiber cables, and optical amplifiers are installed at specified intervals. That is to say, in this kind of long-distance optical transmission system, the optical amplifiers such as optical fiber amplifiers are often laid on the ocean floor.

However, if trouble occurs in an optical amplifier laid on the ocean floor or if it deteriorates, that optical amplifier must be raised to the ocean surface in order to repair or replace it, making maintenance work difficult. Meanwhile, in order to minimize the occurrence of such trouble and deterioration, such an optical amplifier is required to have far greater reliability than an ordinary optical amplifier and it is necessary to use expensive components, making the manufacturing cost very high.

Remote pump has been proposed as one means to deal with this problem. In a remote pump system, a light source that supplies pump light for the optical fiber amplifier (and the circuit that controls that light source) are installed at some distance away from the optical fiber amplifier, normally, as shown in FIG. 1A, the light source is installed at or near the transmitter or receiver. That is to say, in a remote pump system, the light source unit and the control circuit, in which it is easy for trouble to occur, are installed on the ground, and only the optical fiber components (identified in the figures as EDF=erbium–doped fibers), in which breakdown and deterioration almost never occur, are laid on the ocean bottom. For this reason, it is possible to construct a system that is easy to maintain without making an optical fiber amplifier of higher quality (reliability) than necessary, reducing the cost.

However, the amount of information transmitted through the networks has been increasing greatly. In this situation, a great deal of research and development work has been done on the technology to increase the amount of information that the transmission paths can handle. Wavelength Division Multiplex (WDM) transmission is a technology to increase the capacity of transmission paths. Multi-wavelength transmission is a method in which several light signals at different wavelengths are multiplexed for transmission through a single optical transmission path; information can be transmitted on each wavelength (channel). Recently it has been proposed to introduce such a multi-wavelength multiplex transmission system into the remote pump optical transmission system described above. One particular case in which multi-wavelength light is transmitted in an optical transmission system with a remote pump configuration is illustrated in FIG. 1B.

When multi-wavelength light is amplified using an Er-doped fiber (EDF) in a remote pump system, normally the pump light power output from a pump light source ("pump") is held at a constant value in order to measure the stability of the amplification action in the optical fiber amplifier. When pump light is supplied to the optical fiber amplifier, all of the wavelengths of the multi-wavelength light are amplified at once. That is to say, when the multi-wavelength light is being multiplexed in a plurality of channels, signals on a plurality of channels at mutually different wavelengths are amplified all at once.

However, in general the gain in an optical fiber amplifier depends on the wavelength. For this reason, if appropriate pump control is not applied to the optical fiber amplifier, the gain on the different channels on which the multi-wavelength light has been multiplexed will no longer be the same, and the light levels on the different channels will become different. In addition, in multi-wavelength transmission, the greater the number of channels that are multiplexed on one optical fiber, the greater the amount of pump energy that becomes necessary, making it desirable to control the action of the optical fiber amplifier according to this number of channels.

However, in existing remotely pumping systems, control has not been applied considering the wavelength dependence of the optical fiber amplifier gain or the number of channels that are multiplexed. For this reason,the levels on each channel deviate from one another, or the signal light level can be inappropriate causing increased noise.

SUMMARY OF THE INVENTION

This invention relates to a system that transmits multi-wavelength light. The subject of this invention is in the system in which the optical fiber amplifier that amplifies the multi-wavelength light is remotely controlled, to decrease the level deviations on each channel on which the multi-wavelength light is multiplexed and, at the same time, to suppress noise of the multi-wavelength light.

The multi-wavelength light transmission system of this invention assumes that there is at least one optical amplification unit on the transmission path that transmits multi-wavelength light between the a sending station and the receiving station and that a pump of the optical amplification unit is controlled from a remote location.

The system has a light source that generates pump light that is installed within or near the receiving station and supplies that pump light to the at least one optical amplification unit, and a control circuit that is installed within or near the receiving station and adjusts the light emitting power of the light source for the purpose of adjusting the light levels on a plurality of channels which are multiplexed on the multi-wavelength light.

In another embodiment of this invention, the system has a light source that is installed within or near either the sending station or the receiving station and generates pump light that is supplied to the optical amplification unit, a detecting circuit that detects the number of multiplexed wavelengths in the multi-wavelength light, and a control circuit that adjusts the light emitting power of the light source corresponding to the number of multiplexed wavelengths detected by the detecting circuit.

BRIEF DESCRIPTION OF THE DRAWINGS

FIG. 1A is a diagram that explains the basic configuration of a remote pump system.

FIG. 1B is a system configuration diagram for the case in which a remote pump system is introduced into a system that transmits multi-wavelength light.

FIG. 6 is a configuration diagram of the transmission system of the 1st embodiment.

DETAILED DESCRIPTION OF THE INVENTION

The transmission system of this invention assumes that there is at least one optical amplification unit on a transmission path that transmits multi-wavelength light between a sending station and a receiving station, and that the optical amplification unit is controlled from a remote location. The system in accordance with one embodiment includes a light source that is installed within or near the receiving station and generates pump light that is supplied to the at least one optical amplification unit, and a control circuit that is installed within or near the receiving station and adjusts the power of the light emitted by the light source to match the light levels on the plurality of channels which are multiplexed on the multi-wavelength light. This control circuit receives part of the multi-wavelength light from each of the respective channels onto which the multi-wavelength light is branched, in the receiving station and adjusts the power of the light emitted by the light source so that the light levels will be equalized (in agreement). The optical amplification unit is, for example, a rare earth-doped optical fiber.

The wavelength characteristics of the gain of the optical amplification unit are controlled by the power of the pump light supplied from the light source. Here, part of the multi-wavelength light that has been amplified by the optical amplification unit is fed to the control circuit, and feedback control is applied to the light power emitted from the light source in accordance with the wavelength characteristics of that multi-wavelength light. In this way, multi-wavelength light that has the desired wavelength characteristics can be produced.

The transmission system of another embodiment of this invention includes a light source that is installed within or near either the sending station or the receiving station and generates pump light that is supplied to the light amplification unit, a detecting circuit that detects the number of wavelengths in the multi-wavelength light, and a control circuit that adjusts the light power emitted by the light source corresponding to the number of wavelengths detected by the detecting circuit.

When multi-wavelength light is amplified, if the number of channels for transmitting signals on the multi-wavelength light is increased, the amount of pump energy needed to amplify that multi-wavelength light to a specified level also increases. In order to increase the pump energy, the pump power must be increased. Consequently, by making the system in such a configuration that the light power emitted by the light source is adjusted according to the number of multiplex of channels, then, even if the number of channels over which the signal is transmitted is changed, the multi-wavelength light can be adjusted to a specified level by using the light amplification unit.

Figure 2:
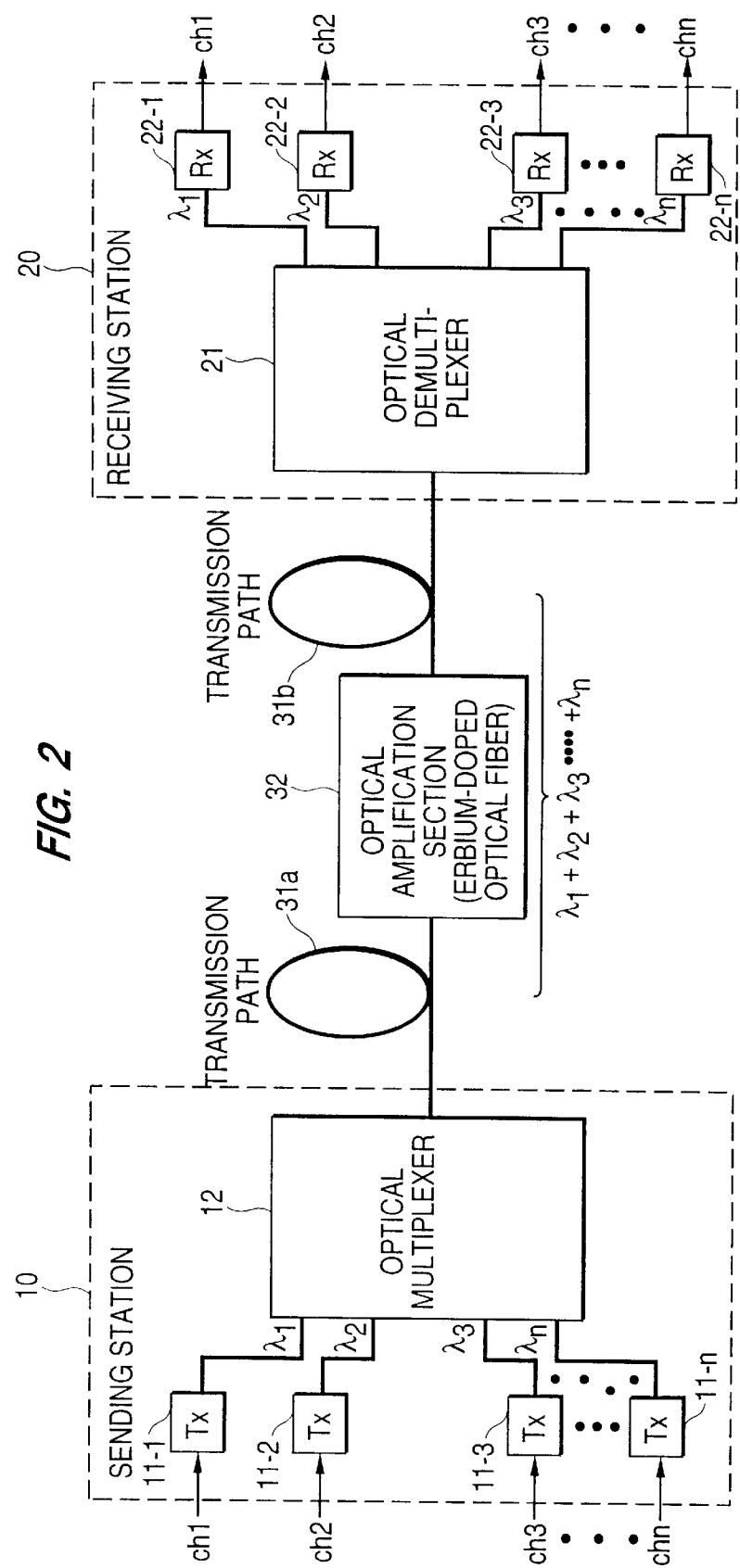
FIG. 2 is an overall configuration diagram of the transmission system of this embodiment.

Let us now explain an embodiment of this invention referring to the drawings. FIG. 2 is an overall configuration diagram of the light transmission system of this embodiment; it will be used principally to explain the transmission of the multi-wavelength light. The transmission system of this embodiment transmits multi-wavelength light as signal light from the sending station 10 to the receiving station 20. This multi-wavelength light can multiplex the signals on a plurality of channels (ch 1 to ch n). The multi-wavelength light sent from the sending station 10 is amplified by the one or more optical amplification sections on the transmission path and transmitted to the receiving station 20.

The transmitters (Tx) 11-1 to 11-n output their respective signals on signal light of mutually different wavelengths (the signal light wavelengths are $\lambda 1$ to $\lambda n$, respectively. These signal light outputs are multiplexed by the wave optical multiplexer 12 and output to the transmission path 31a. That is to say, the sending station 10 outputs multi-wavelength light including the n wavelength components $\lambda 1$ to $\lambda n$ as signal light. This multi-wavelength light is amplified by the optical amplifier 32 and transmitted to the receiving station 20. Multi-wavelength light that has been transmitted via the transmission path 31b is split into the wavelengths $\lambda 1$ to $\lambda n$ by the wave optical demultiplexer 21 and the wavelength components are input to the respective receivers Rx 22-1 to 22-n. Thus, in the transmission system of this embodiment, signal light that is sent from the respective transmitters 11-1 to 11-n is transmitted via a transmission path as multi-wavelength light and received by the respective receivers 22-1 to 22-n.

The multi-wavelength light that is transmitted from the sending station 10 to the receiving station 20 is, for example, transmitted using the 1550 nm band. In this case, the wavelengths $\lambda 1$ to $\lambda n$ that carry the signals on channels ch 1 to ch n are, for example, chosen in the range 1530 nm to 1560 nm.

Assuming that signal light in the 1550 nm wavelength band is used, rare earth-doped optical fiber, for example, can be used as the optical amplification section 32. This rare earth-doped optical fiber is, for example, erbium-doped optical fiber into which erbium has been injected. The following explanation assumes that erbium-doped optical fiber is used as the rare earth-doped optical fiber. As is well-known among people in this industry, erbium-doped optical fiber must be given pump energy by pump light that is supplied separately from the signal light to be amplified (the multi-wavelength light sent from the sending station 10 in FIG. 2), and the signal light passing through the erbium-doped optical fiber is amplified by that pump energy.

The transmission system of this embodiment has a remote-controlled configuration. The light source that generates the pump light and the circuit that controls that light source are located away from the optical amplification section (the erbium-doped optical fiber)32. This light source and light source control circuit are not shown in FIG. 2, but, for example, can be installed within or near the sending station 10, or within or near the receiving station 20.

Figure 3:
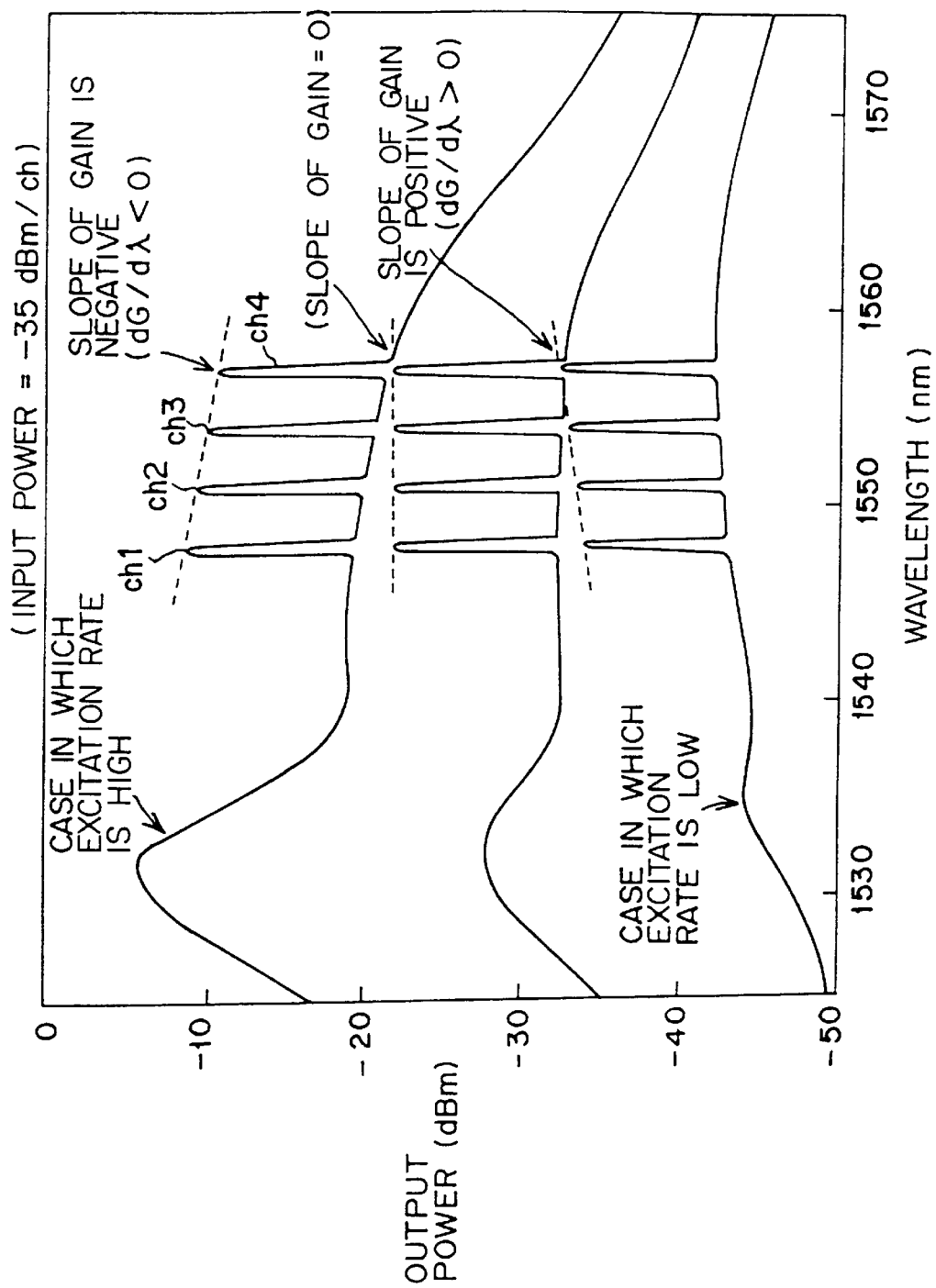
FIG. 3 is a diagram showing the wavelength characteristics of the optical gain of erbium-doped optical fiber.

FIG. 3 shows the wavelength characteristics of the optical gain of the erbium-doped optical fiber. FIG. 3 shows the power distribution of light output when input light is amplified using an erbium-doped optical fiber; assuming that input light has constant power, this graph essentially shows the optical gain of the erbium-doped optical fiber. The wavelength characteristics of the erbium-doped optical fiber are such that, in the signal transmission wavelength band (1530 to 1560 nm), when the excitation rate (the erbium inversion distribution rate) is high, the gain on the long wavelength side is small compared to the gain on the short wavelength side, while when the excitation rate is low, the gain on the short wavelength side is small compared to the gain on the long wavelength side. That is to say, when the excitation rate of the erbium-doped optical fiber is high, the slope of the gain as a function of wavelength is negative; when the excitation rate is low, the slope of the gain as a function of wavelength is positive.

The excitation rate of an erbium-doped optical fiber can be controlled by the pump light power. That is to say, when the power of the pump light supplied to the erbium-doped optical fiber is large, the excitation rate becomes high, and the slope of the gain as a function of wavelength is negative. On the other hand, when the pump light power is small, the excitation rate drops, and the slope of the gain as a function of wavelength becomes positive. These relationships are shown in FIG. 4.

Figure 5A:
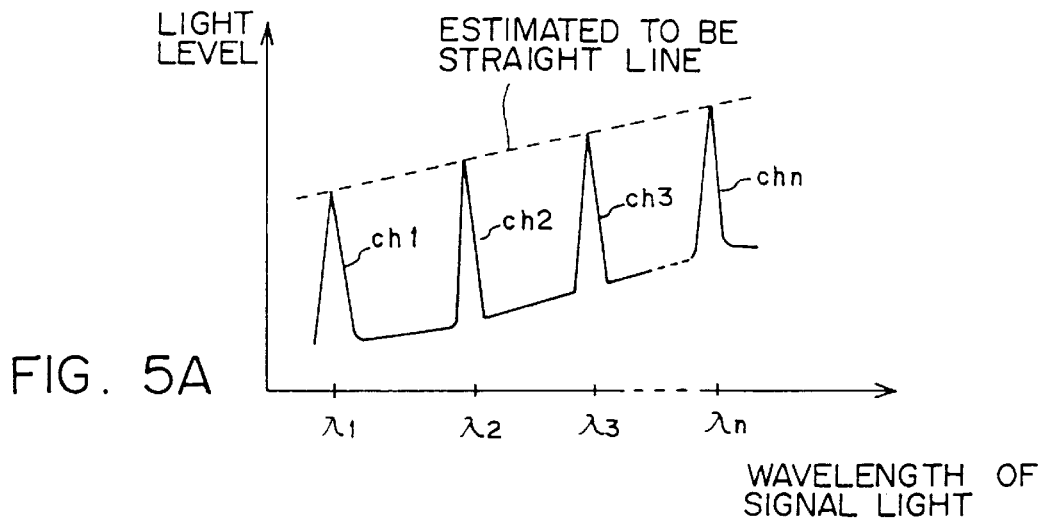
FIGS. 5A and 5B are diagrams showing the light level on each channel included in the multi-wavelength light.
Figure 5B:
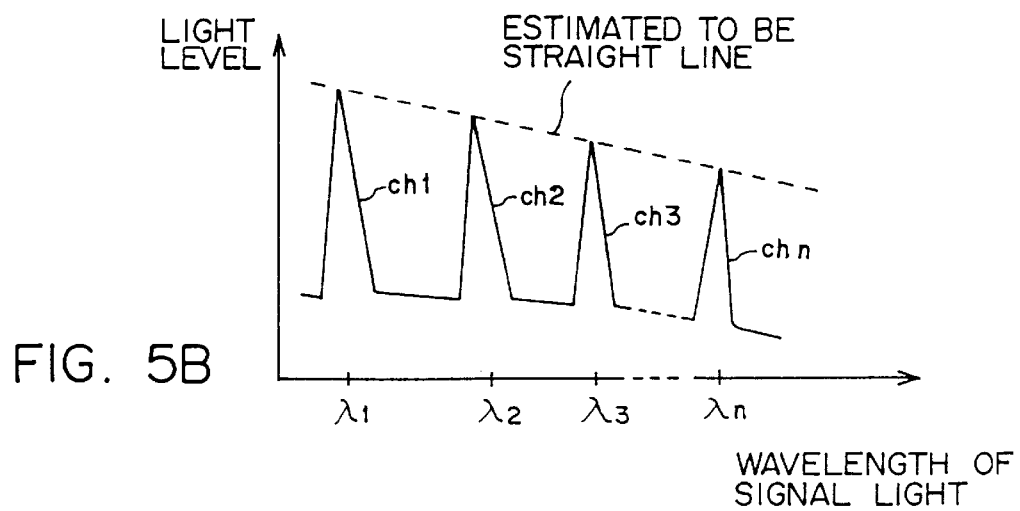

If the composition of the matter injected into the optical fiber is chosen appropriately, then, as shown by the dotted line in FIG. 3, the system can be configured so that the gain in the erbium-doped optical fiber varies roughly linearly with the wavelength of the multi-wavelength light to be amplified. In other words, if erbium-doped optical fiber having such composition that the gain varies linearly with the wavelength of the multi-wavelength light is installed on the transmission path, then, as shown in FIG. 5A and FIG. 5B, the light level on each channel which is multiplexed on the multi-wavelength light can be expected to vary linearly with the wavelength.

Considering this characteristic, if the light levels on any 2 arbitrary channels which are multiplexed on the multi-wavelength light can be made to agree, then it can be expected that the light levels on all of the channels will agree. In this case, if, among the channels which are multiplexed on the multi-wavelength light, the channel having the shortest wavelength and the channel having the longest wavelength are chosen and the light levels on those 2 channels are made to agree, then it can be expected that the deviation of light levels among the channels will be minimized. That is to say, as shown in FIG. 5A and FIG. 5B, if it is assumed that the shortest wavelength $\lambda 1$ is assigned to ch 1 and the longest wavelength $\lambda n$ is assigned to ch n, then, in order to equalize the light levels among the channels ch 1 to ch n, it is sufficient to detect the light levels on ch 1 and ch n and control them so that they are brought into agreement.

Figure 4:
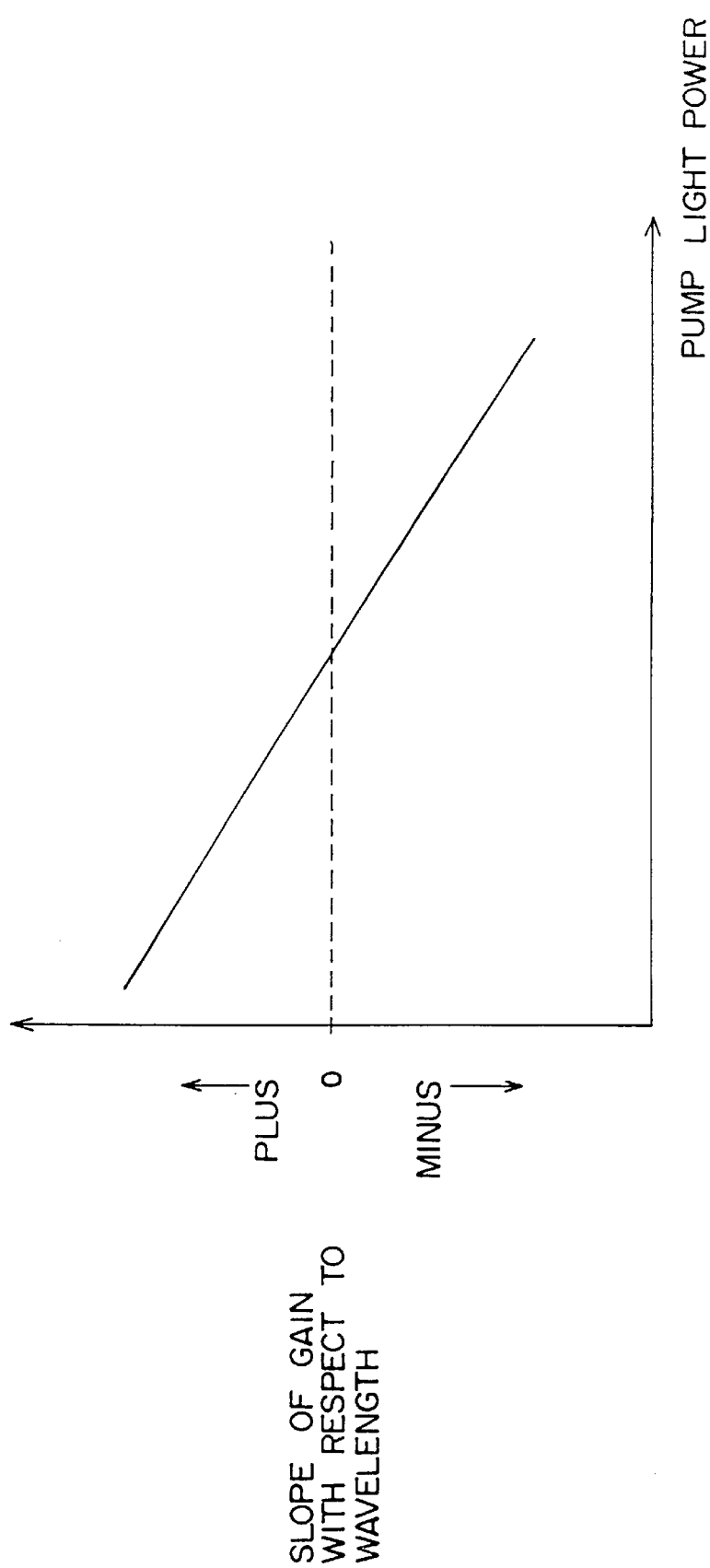
FIG. 4 is a diagram showing the slope of the gain with respect to pump light power and wavelength.

In the transmission system of this embodiment, the characteristic shown in FIG. 3 to FIG. 5 above is used. That is to say, the light levels on each of the channels which are multiplexed on the multi-wavelength light, amplified by erbium-doped optical fiber, are detected, and then the power of the pump light supplied to the erbium-doped optical fiber is varied in accordance with the results of that detection to adjust the wavelength characteristics (gain) of the erbium-doped optical fiber. This equalizes the light levels on all of the channels. The transmission system of this embodiment has a remote pump configuration, and the control of the pump light is applied at a position removed from where the erbium-doped optical fiber is installed.

FIG. 6 is a configuration diagram of the transmission system of the 1st embodiment. The sending station 10, as was explained above with reference to FIG. 2, outputs multi-wavelength light as the signal light onto the transmission path. This multi-wavelength light carries signal light ch 1 to signal light ch n. Signal light ch 1 to signal light ch n consists of the signal light to which the wavelengths $\lambda 1$ to $\lambda n$ have been assigned, respectively. That is to say, this multi-wavelength light includes the wavelength components of signal light ch 1 to signal light ch n. The multi-wavelength light sent from the sending station 10 is amplified by the erbium-doped optical fiber (referred to below as the EDF) 41 and transmitted to the receiving station 20.

Pump light is output from the light source (pump) 45 and supplied to the EDF 41. Its pump energy amplifies the multi-wavelength light (the signal light). The WDM coupler 42 has the function of synthesizing light of mutually different wavelengths. When the multi-wavelength light output by the sending station 10 and the pump light output from the light source 45 are incident on the WDM coupler 42, they are synthesized and output. Consequently, multi-wavelength light and pump light are input to the EDF 41.

The multi-wavelength light transmitted via the transmission paths 43a and 43b is split into its component wavelengths in the receiving station 20. The receiving station 20 will be explained with reference to FIG. 7. The multi-wavelength light is split into light of each component wavelength $\lambda 1$ to $\lambda n$ by the wave optical demultiplexer 21 and the separate components are input respectively into the receivers (Rx) 22-1 to 22-n. The light input into the receivers 22-1 to 22-n has components of wavelengths $\lambda 1$ to $\lambda n$; comprising the signal light ch 1 to the signal light ch n, respectively. Part of each of the signal light components ch 1 to ch n is split off by the respective branching couplers 46-1 to 46-n. Those branched portions of the signal light components ch 1 to ch n are input to the control circuit (cont1) 44. When the control circuit 44 receives the branched portions of the signal light components ch 1 to ch n, the control circuit 44 controls the output power of the light source 45 so as to equalize the light levels of ch 1 to ch n. The configuration and action of the control circuit 44 will be described in detail below.

The pump light output from the light source 45 is supplied to the EDF 41 and puts it into the excited state. Here, the gain characteristics of the EDF 41 are controlled according to the power of the pump light as described above. The power of this pump light is adjusted to a level that equalizes the light levels on the respective channels which are multiplexed on the multi-wavelength light by the control circuit 44. Consequently, the multi-wavelength light transmitted via the transmission paths 43a and 43b is amplified by the EDF 41 in such a way that the light levels on all of the channels are equalized at the time the light is received by the receiving station 20.

As explained above, the transmission system shown in FIG. 6 comprises a feedback system. In this feedback system, the gain of the EDF 41 is controlled based on the wavelength characteristics of the multi-wavelength light that is amplified by the EDF 41.

Thus, in the transmission system shown in FIG. 6, which transmits multi-wavelength light, the power of the remote pump light source that supplies pump light to the erbium-doped optical fiber is adjusted considering the light levels on each channel which are multiplexed on the multi-wavelength light, so that the deviation among light levels on each channel is minimized at the receiving station.

If, instead of using the remote pump system shown in FIG. 6, an optical amplifier into which the EDF 41, the control circuit 44 and the light source 45 are incorporated into one unit is used, then, even if the deviations of the light levels on the different channels are minimized at the time of output from that optical amplifier, when the signal is received by the receiving station 20, the waveform will have been attenuated by transmission through the transmission path 43b so that the deviations among the light levels on the different channels will no longer necessarily be a minimum. In the remote pump configuration shown in FIG. 6, this problem has been corrected.

Figure 8A:
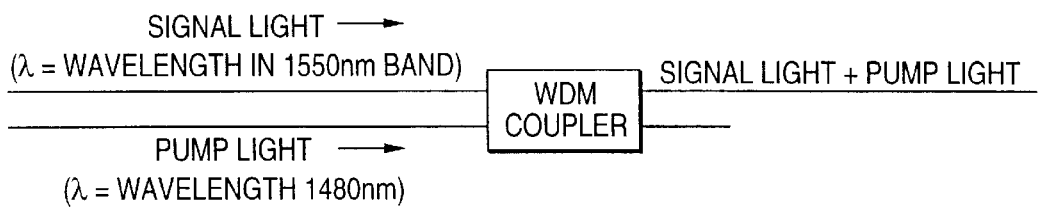
FIGS. 8A to 8D are diagrams explaining the WDM coupler and the branching coupler.
Figure 8B:
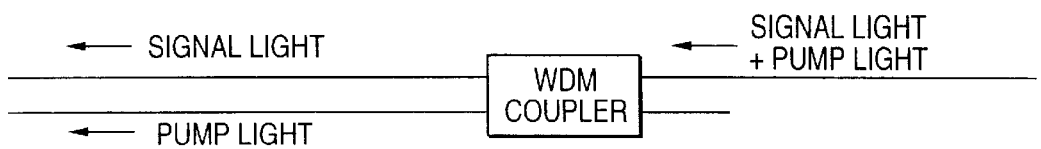

Let us now explain the WDM coupler and the branching coupler. As shown in FIG. 8A, the WDM coupler can synthesize light of different wavelengths. That is to say, in the system shown in FIG. 6, when the signal light (the multi-wavelength light) and the pump light are input into the WDM coupler, they are synthesized and output from a single output port. In addition, the WDM coupler, as shown in FIG. 8B, can split light that has been formed by synthesis of light of different wavelengths into its component wavelengths. That is to say, when light that has been formed by synthesis of the signal light (the multi-wavelength light) and the pump light is input into the WDM coupler, that input light is split into the signal light and the pump light, which are then output separately.

Figure 8C:
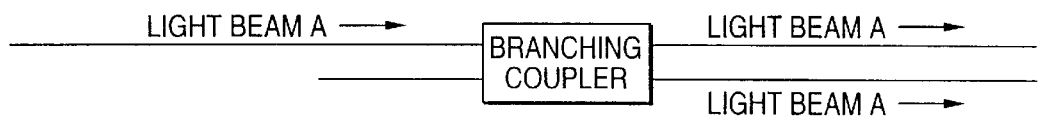
Figure 8D:
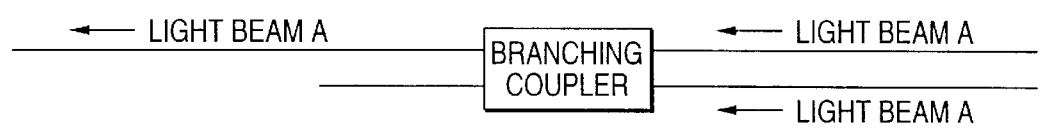

The branching coupler, as shown in FIG. 8C, branches off a prescribed fraction of the input light. That is to say, when the signal light is input into the branching coupler, that signal light is branched and the branches are output separately; when pump light is input, that pump light is branched and the branches are output separately. In this case, the branching coupler functions as a beam splitter. When light is input to the branching coupler from 2 ports, as shown in FIG. 8D, the branches are coupled and output together.

Figure 9:
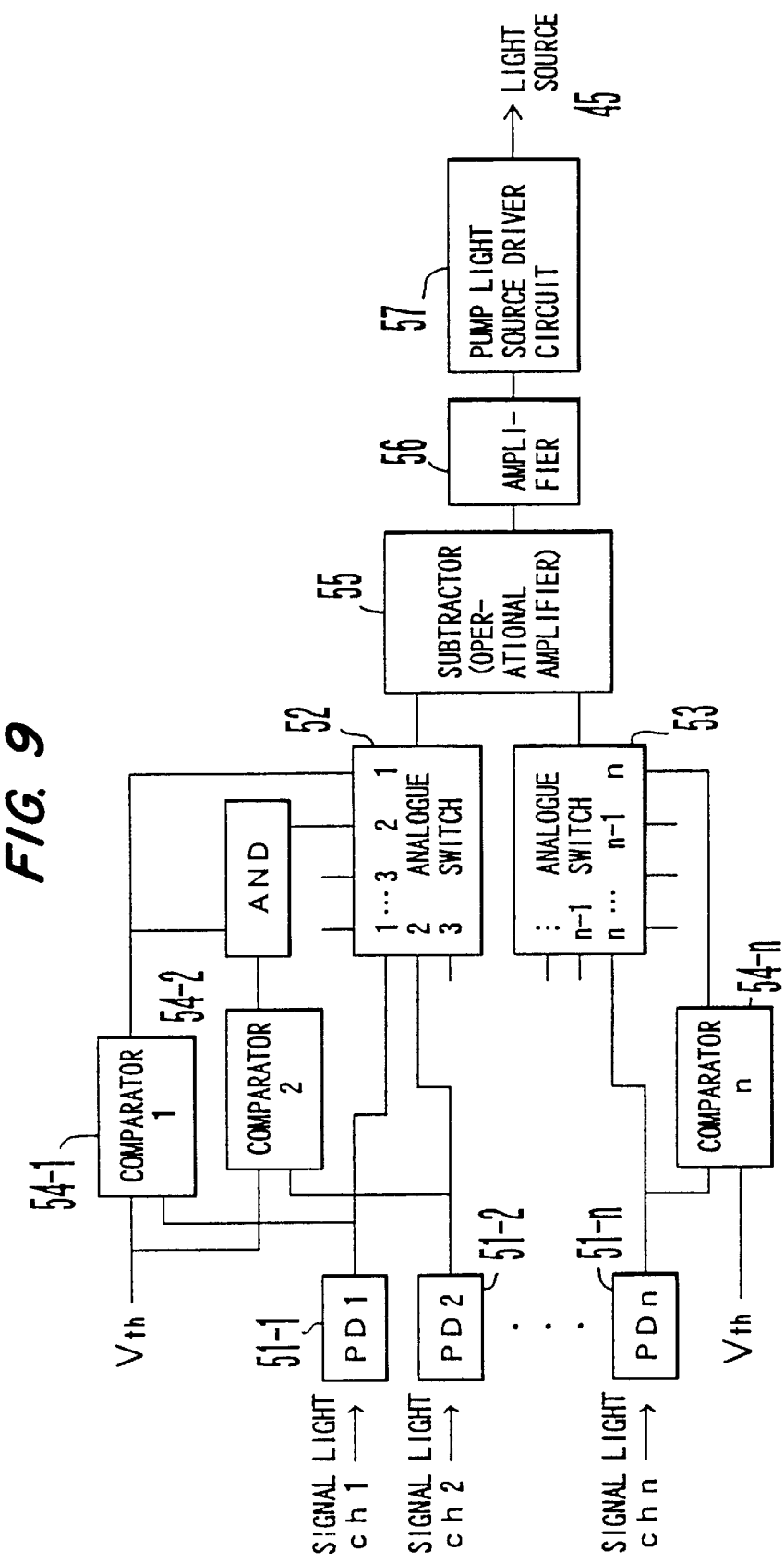
FIG. 9 is a configuration diagram of the control circuit in FIG. 6.

FIG. 9 is a block diagram of the control circuit 44 shown in FIG. 6. The photodiodes (PDs) 51-1 to 51-n receive the signal light from ch 1 to ch n, respectively, and voltages corresponding to those light levels are output. That is to say, the outputs from the photodiodes 51-1 to 51-n are signals that indicate the light levels on the channels ch 1 to ch n respectively. The outputs from the photodiodes 51-1 to 51-n are input to the analogue switches 52 and 53 as the light levels of the respective channels. In addition, the outputs from the photodiodes 51-1 to 51-n are input to the comparators 54-1 to 54-n.

Figure 10:
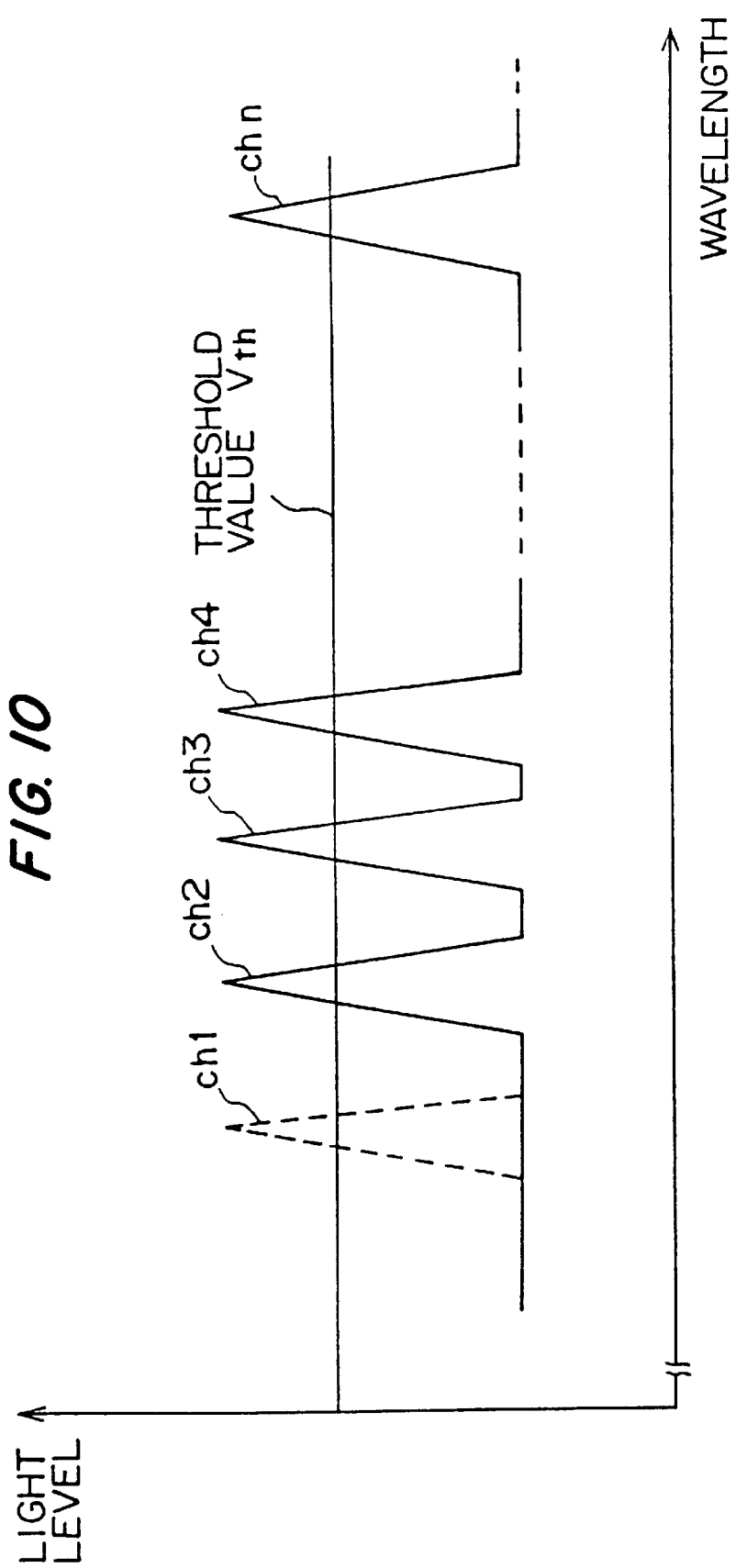
FIG. 10 is a diagram explaining the difference between states in which a signal is being transmitted and in which a signal is not being transmitted.

The comparators 54-1 to 54-n compare the light levels on the various channels to the threshold value Vth, and output the results of those comparisons on TTL level. These threshold values Vth are determined as follows. In the multi-wavelength transmission system, the signals are transmitted through specified channels; the light levels on the channels through which the signals are transmitted are higher than the light levels on channels that are not transmitting signals. In FIG. 10, channels 2 to n are transmitting signals, but channel 1 is not. The threshold value Vth is set at such a level that it can be used to judge whether each channel is transmitting a signal or not. The comparators 54-1 to 54-n output "L" level when the received light level is larger than the threshold Vth. That is to say, the comparators 54-1 to 54-n output "L" level when the corresponding channels are transmitting signals.

The output of the comparator 54-1 is input to the #1 selection terminal of the analogue switch 52. When "L" level is input to the #1 selection terminal of the analogue switch 52, that is to say when the output of the comparator 54-1 is at "L" level, the analogue switch 52 outputs the voltage that is input to the #1 input terminal. That is to say, when channel 1 is transmitting a signal, the analogue switch 52 outputs the light level that is detected on channel 1. On the other hand, when the output of the comparator 54-1 is at "H" level, that is to say when channel 1 is not transmitting a signal, the analogue switch 52 does not output the voltage that is applied to the #1 input terminal.

The logical product of the output of the comparator 54-1 and the comparator 54-2 is input to the #2 selection terminal of the analogue switch 52. Consequently, when the output of the comparator 54-1 is at "H" level and the output of the comparator 54-2 is at "L" level, "L" level is input to the #2 selection terminal of the analogue switch 52; the analogue switch 52 then outputs the voltage that is applied to the #2 input terminal. That is to say, when channel 1 is not transmitting a signal and channel 2 is transmitting a signal, the analogue switch 52 outputs a signal related to the light level on channel 2.

Thus, the analogue switch 52 outputs a signal that indicates the light level on the channel that has the shortest wavelength among the channels that are transmitting signals. Similarly, the analogue switch 53 outputs a signal that indicates the light level on the channel that has the longest wavelength among the channels that are transmitting signals. Consequently, as shown, for example, in FIG. 10, when there is no signal being transmitted on channel 1 but signals are being transmitted on channels 2 to n, the analogue switch 52 outputs a signal that indicates the light level on channel 2, and the analogue switch 53 outputs a signal that indicates the light level on channel n. The outputs of the analogue switches 52 and 53 are input to the subtractor 55.

The subtractor 55 is, for example, an operational amplifier. The subtractor 55 forms part of the feedback system described above. It acts to make the difference between the output of the analogue switch 52 and the output of the analogue switch 53 "0". The amplifier 56 amplifies the output of the subtractor 55. The pump light source drive circuit 57 includes, for example, a power transistor; it passes a current corresponding to the output of the amplifier 56 and drives the light source 45. The light source 45 includes, for example, a laser diode; it outputs light of power corresponding to the current supplied from the pump light source drive circuit 57 as the pump light.

Thus, the control circuit 44 controls the power of the light emitted by the light source 45 to bring the light levels on the channel having the shortest wavelength and the channel having the longest wavelength, among channels that are transmitting signals, into agreement.

Figure 7:
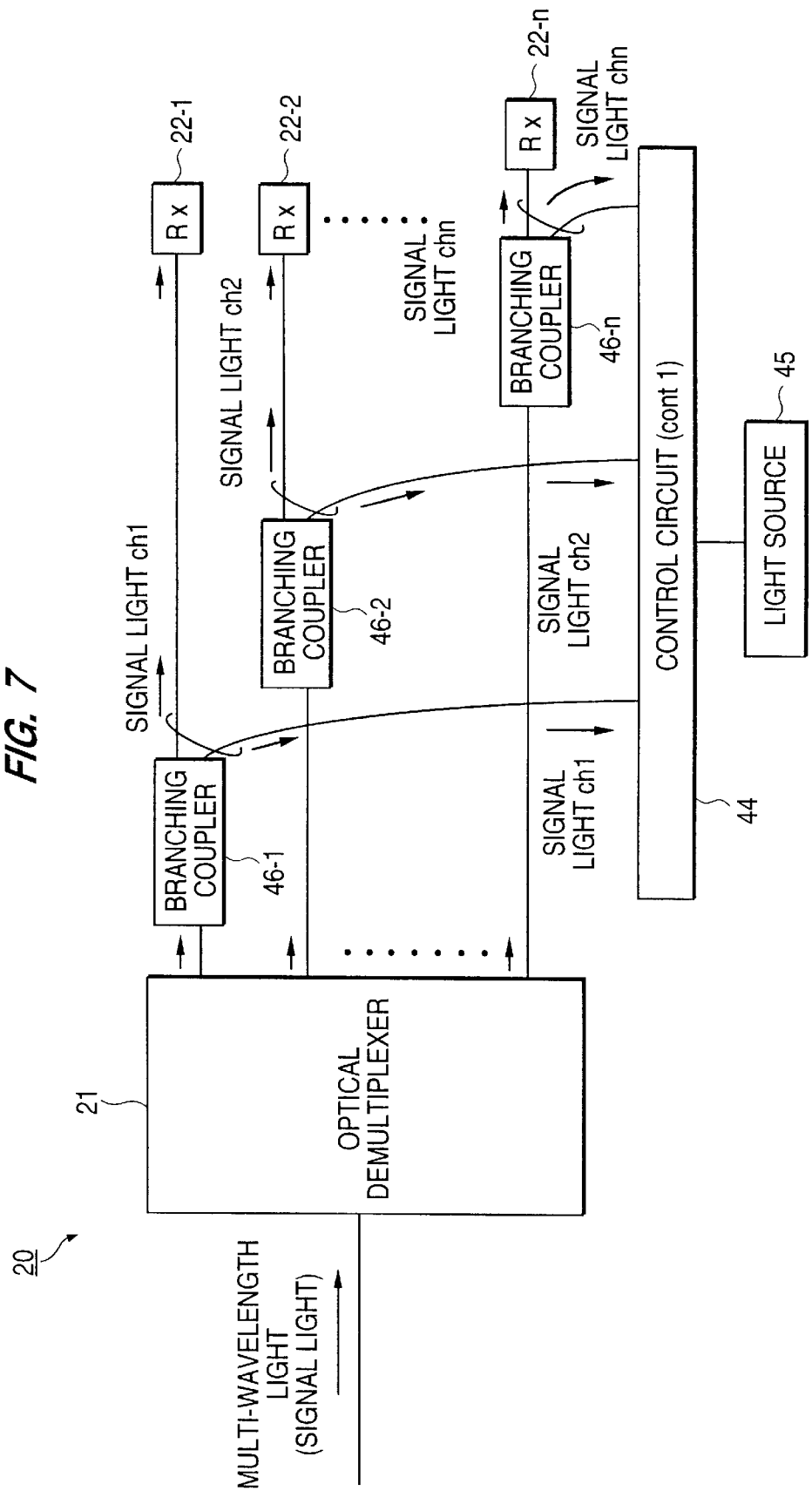
FIG. 7 is a diagram explaining the configuration of the receiving station.

FIG. 6 and FIG. 7 show a configuration in which components of signal light branched by the optical demultiplexer 21 are input to the control circuit 44; but it is also possible to have a configuration in which part of the multi-wavelength light before splitting by the optical demultiplexer 21 is input to the control circuit 44, and the control circuit 44 extracts the wavelength component of each channel.

Figure 11:
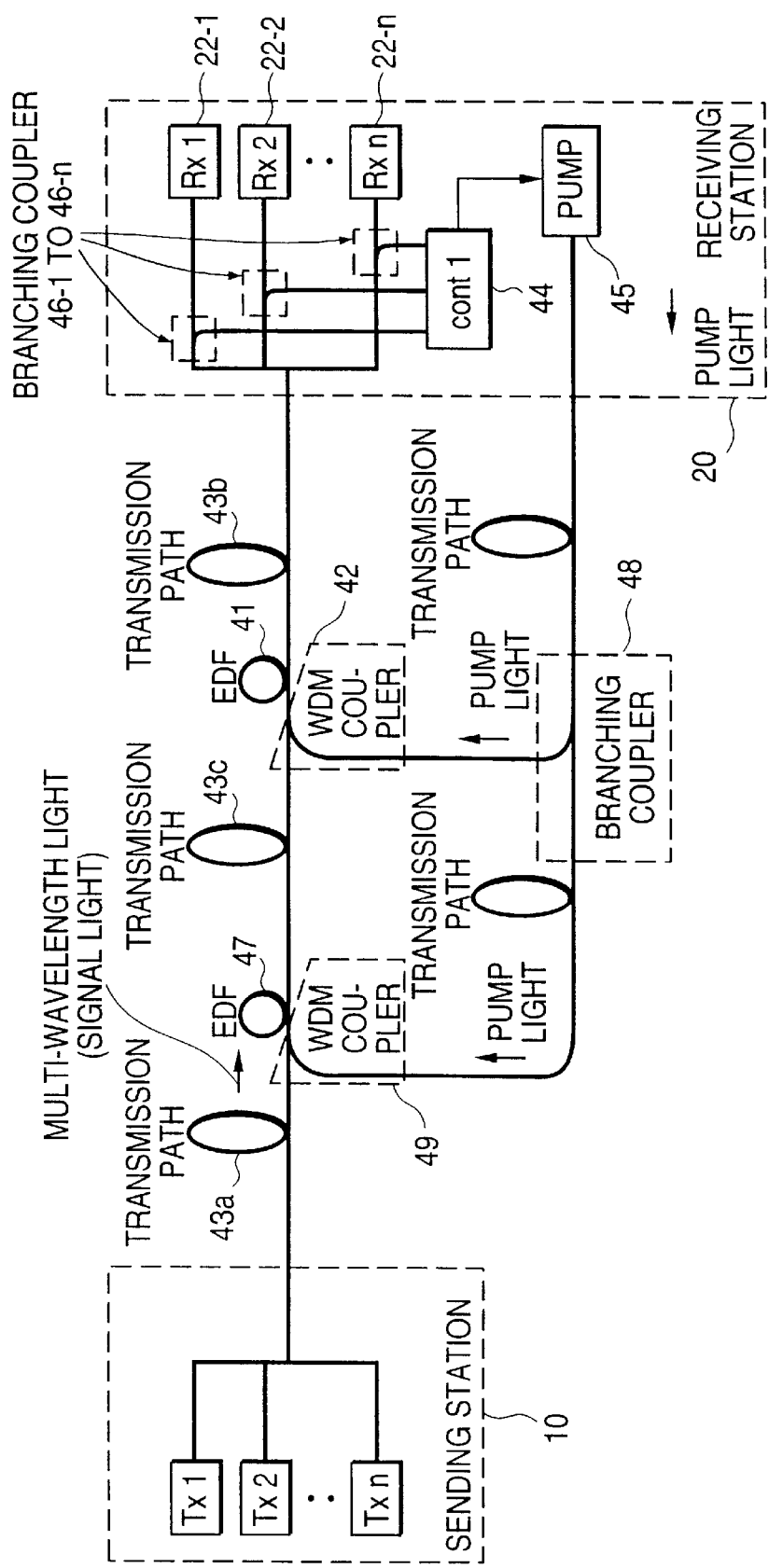
FIG. 11 is a configuration diagram of the transmission system of the 2nd embodiment.

FIG. 11 is a configuration diagram of the transmission system of the 2nd embodiment. In the system of the 1st embodiment shown in FIG. 6, there was one erbium-doped optical fiber (EDF 41) on the transmission path between the sending station 10 and the receiving station 20; in the system of the 2nd embodiment, there are 2 erbium-doped optical fibers (EDF 41 and 47). In the system of the 2nd embodiment, pump light produced by the light source (pump) 45 is branched using the branching coupler 48; the branches of the pump light are fed to EDF 41 and EDF 47, respectively. When pump light is fed to EDF 47, the multi-wavelength light and the pump light are synthesized using the WDM coupler 49.

Thus, in the system of the 2nd embodiment, the gains of a plurality of erbium-doped optical fibers are adjusted simultaneously.

Figure 12:
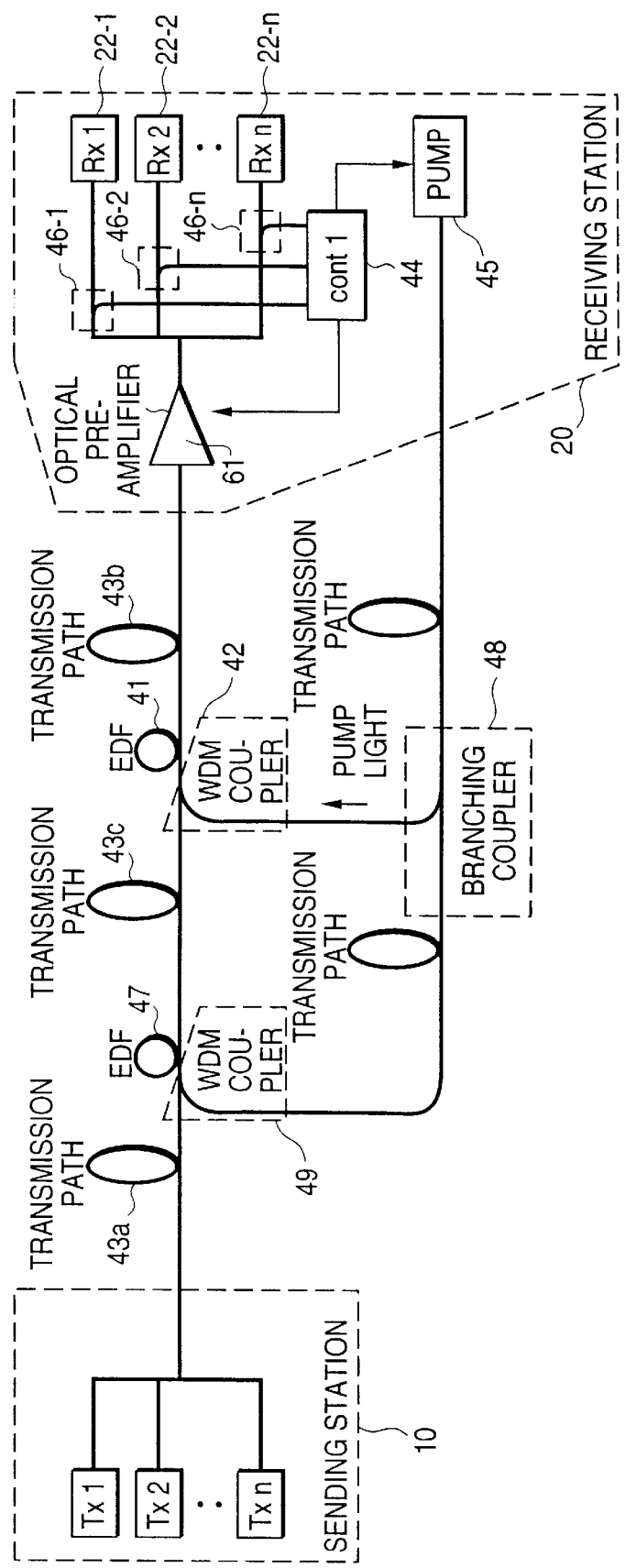
FIG. 12 is a configuration diagram of the transmission system of the 3rd embodiment.

FIG. 12 is a configuration diagram of the transmission system of the 3rd embodiment. In the system of the 3rd embodiment, the optical preamplifier 61 is added to the system of the 2nd embodiment. The optical preamplifier 61 is, for example, an optical amplifier that includes an erbium-doped optical fiber and a laser light source; it amplifies multi-wavelength light that is transmitted via the transmission path 43b. The gain of the optical preamplifier 61 is controlled by the control circuit 44. Thus, in the system of the 3rd embodiment, after the deviations among the light levels on the channels which are multiplexed on the multi-wavelength light is multiplexed have been adjusted, the level deviations are corrected again within the receiving station 20.

The configuration of the 3rd embodiment provides the following advantages. In a remote pump configuration, until the pump light is transmitted to the EDF 41 or the EDF 47, attenuation occurs on that transmission path, so it is necessary to increase the power of the pump light that is emitted to or above a certain level. Meanwhile, in order to increase the power of the pump light that is emitted, it becomes necessary to use a large electrical current to drive the light source, but as a practical matter there is a limit as to how much the power of the pump light that is emitted can be increased. For this reason, as a practical matter it is not easy to increase the dynamic range of the light emission power of the pump light. Here, the gain of the erbium-doped optical fiber is controlled by the power of the pump light input to it, so if the dynamic range of the power of the pump light is narrow, it will not be possible to adequately adjust the deviations among the light levels on the different channels. The system of the 3rd embodiment corrects this problem. Specifically, by installing an optical preamplifier in the receiving station, a large dynamic range is obtained with small power consumption, and it becomes possible to efficiently adjust the deviations of the light levels among the different channels.

Figure 13:
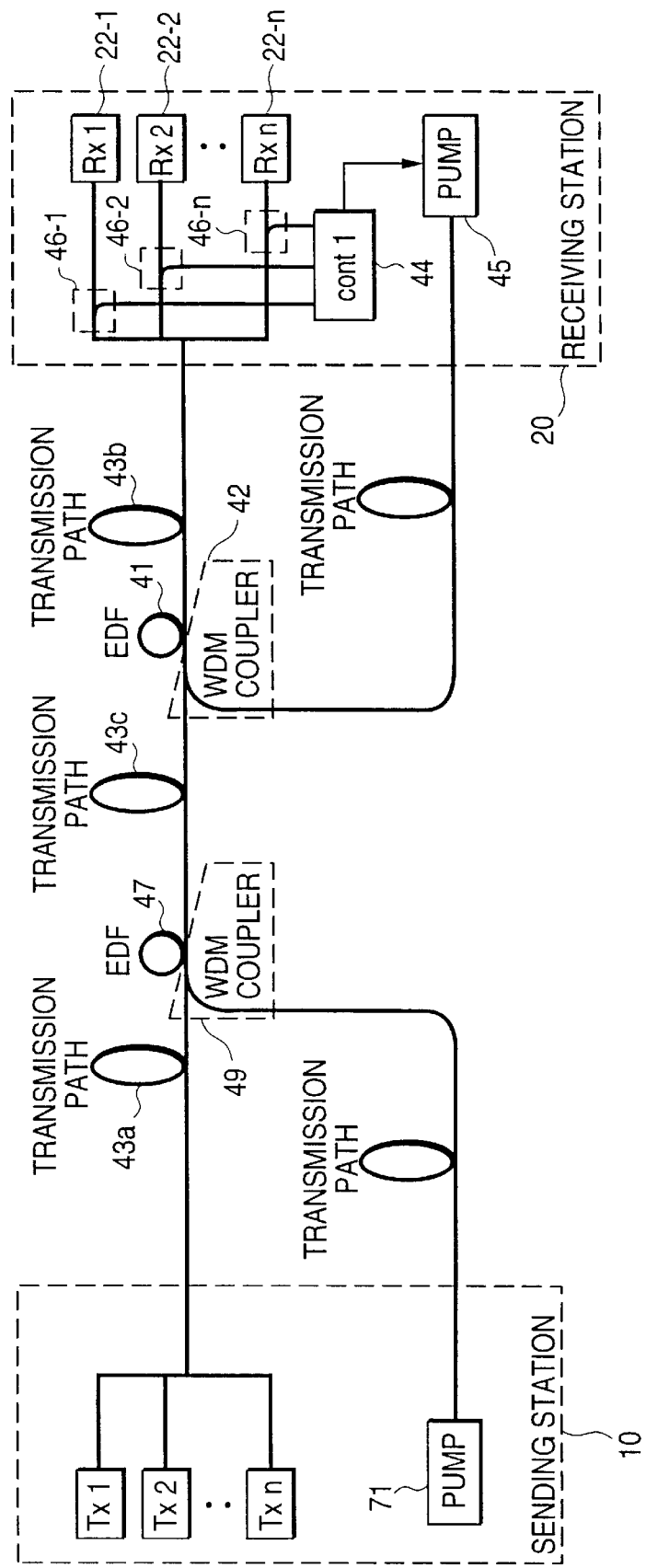
FIG. 13 is a configuration diagram of the transmission system of the 4th embodiment.

FIG. 13 is a configuration diagram of the transmission system of the 4th embodiment. In the system of the 4th embodiment, pump light is supplied from the receiving station 20 to the erbium-doped optical fiber (EDF 41) installed on the receiving station 20 side, and pump light is supplied from the sending station 10 to the erbium-doped optical fiber (EDF 47) installed on the sending station 10 side. The pump light supplied to EDF 47 is generated by the light source 71 installed in the sending station 10. The light source 71 can be driven by a fixed electrical current or it can be driven by ALC (Automatic Level Control). The gain of EDF 41 is controlled in the same manner as in the system of the 1st embodiment shown in FIG. 6.

In the configuration described above, compared to the system of the 2nd embodiment shown in FIG. 11, the power consumed in generating the pump light can be decreased. That is to say, in the system of the 2nd embodiment, it was necessary to transmit pump light generated by the light source 45 to EDF 47, but in the system of the 4th embodiment it is necessary to use only enough power to excite EDF 41. In addition, the transmission distance from the light source 71 to EDF 47 is less than the transmission distance from the light source 45 to EDF 47, so it is not necessary to greatly increase the light emitting power of the light source 71.

Figure 14:
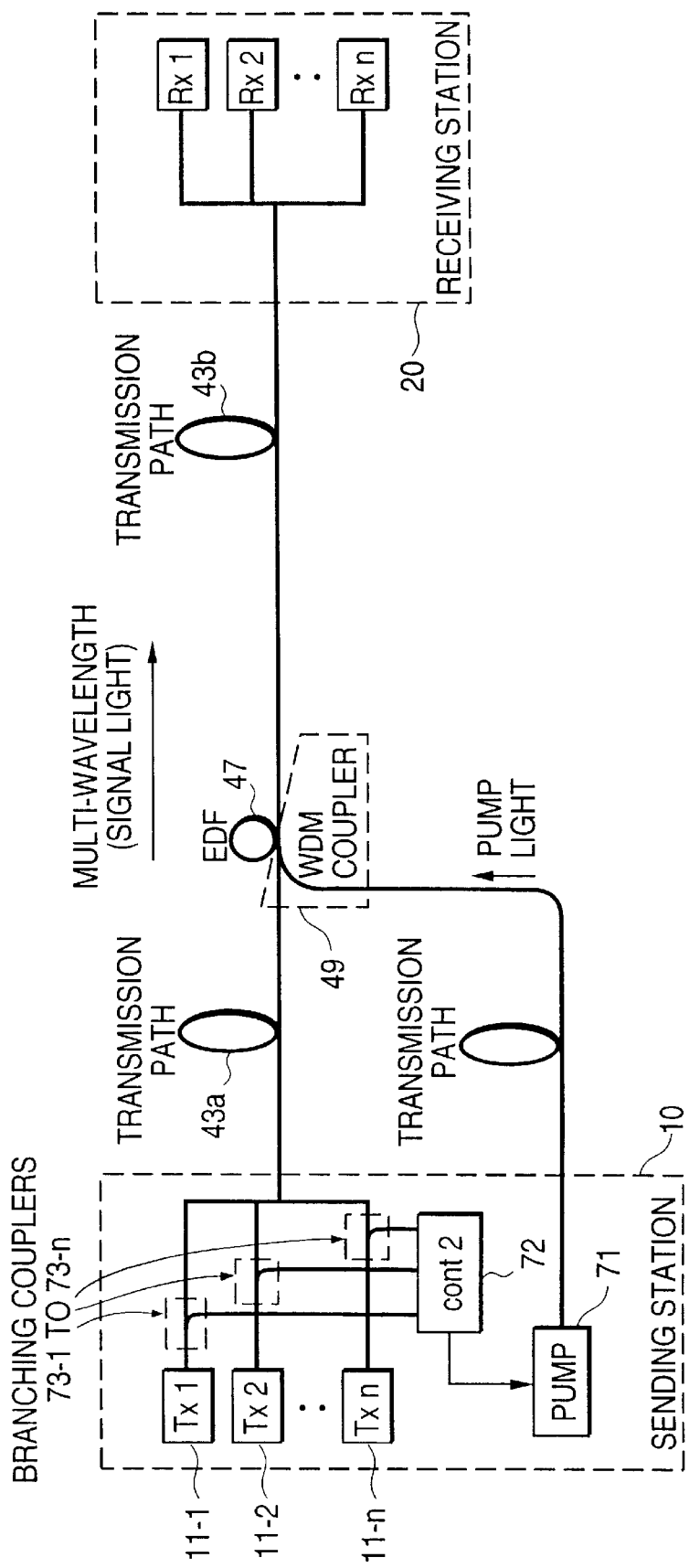
FIG. 14 is a configuration diagram of the transmission system of the 5th embodiment.

FIG. 14 is a configuration diagram of the transmission system of the 5th embodiment. In the system of the 5th embodiment, the number of channels, among the channels which are multiplexed on the multi-wavelength light is multiplexed, on which signals are being transmitted (the number of multiplexed wavelengths) is detected, and the pump light is controlled according to that number of channels.

In general, when multi-wavelength light is amplified using an optical fiber amplifier, the greater the number of channels, among the channels which are multiplexed on the multi-wavelength light, on which signals are being transmitted, the greater the amount of pump energy that is necessary. In addition, in an optical amplifier in a transmission system, the gain of that optical amplifier must be appropriately controlled. That is to say, if the gain is too small, the signal light will not be transmitted to the receiver, while if the gain is too large, noise will be increased by nonlinear effects in the transmission path. Consequently, in a system in which multi-wavelength light is transmitted using a optical fiber amplifier, it is desirable to adjust the pump light that is supplied to the optical fiber amplifiers in accordance with the number of channels on which signals are being transmitted.

In the transmission system of the 5th embodiment, this is considered in controlling the pump light supplied to the erbium-doped optical fiber. That is to say, the control circuit (cont2) 72 detects the number of channels on which signals are being transmitted, and adjusts the power of the light emitted by the light source 71 in accordance with that number of channels.

The branching couplers 73-1 to 73-n branch the signal light (the signal light on ch 1 to ch n) that is output from the transmitters 11-1 to 11-n, respectively, and feeds the branched signal light to the control circuit 72. That is to say, part of each component of the signal light (the signal light on ch 1 to ch n) before synthesis by the optical multiplexer (the optical multiplexer 12 shown in FIG. 2) is fed to the control circuit 72. Consequently, the control circuit 72 can detect the output levels of the transmitters 11-1 to 11-n.

Figure 15:
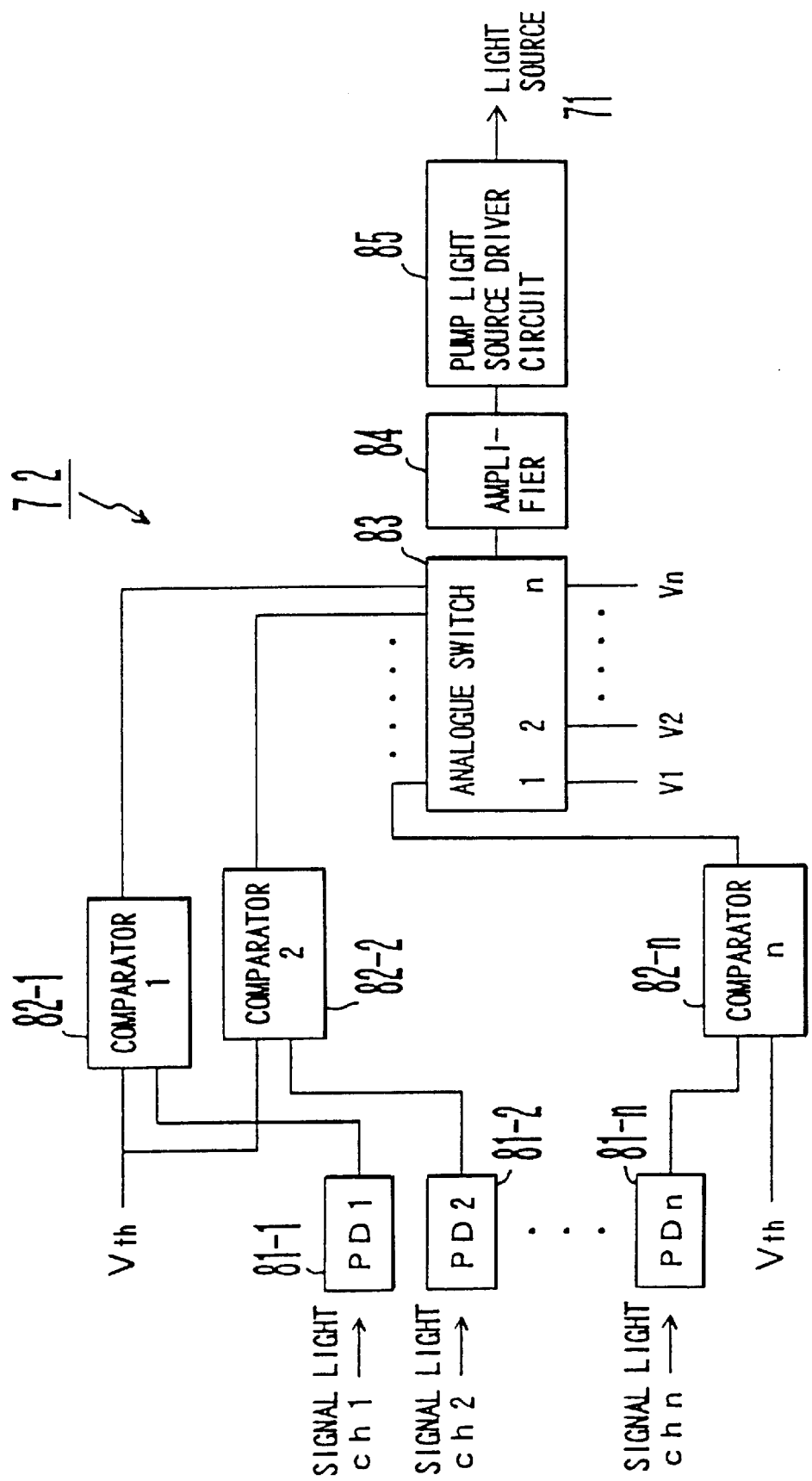
FIG. 15 is a configuration diagram of the control circuit 72 shown in FIG. 14.

FIG. 15 is a configuration diagram of the control circuit 72 shown in FIG. 14. Light branched from the light output from each of the transmitters 11-1 to 11-n is received by the photodiodes (PDs) 81-1 to 81-n, respectively. The photodiodes 81-1 to 81-n output voltages corresponding to the respective received light levels. That is to say, the photodiodes 81-1 to 81-n detect the light levels of outputs from transmitters 11-1 to 11-n, respectively. The outputs from the photodiodes 81-1 to 81-n are input to the comparators 82-1 to 82-n, respectively.

The comparators 82-1 to 82-n compare the voltage levels received from the photodiodes 81-1 to 81-n, respectively, to a preset threshold value Vth. This threshold value Vth is for the purpose of judging whether or not the light includes a signal. That is to say, as was discussed with reference to FIG. 10, the light levels on channels that are transmitting signals are larger than the light levels on channels that are not transmitting signals, so by setting this threshold value Vth so as to permit judgment of this level difference, it can be judged whether or not each of the channels is transmitting a signal. Each of the comparators 82-1 to 82-n outputs "H" level when the corresponding channel is transmitting a signal, "L" level when the corresponding channel is not transmitting a signal.

The analogue switch 83 receives the output signals from the comparators 82-1 to 82-n. Then the number of signals that are at "H" level is counted to determine the number of channels on which signals are being transmitted. The analogue switch 83 has n voltage setting terminals. The voltages V1 to Vn are applied to these voltage setting terminals, respectively. The analogue switch 83 outputs a voltage applied to one of the voltage setting terminals corresponding to the number of channels. For example, if m channels are transmitting signals, the voltage Vm is output. The voltages Vi (i=1, 2, . . . , n) correspond to the amount of pump light power.

The output from the analogue switch 83 is amplified by the amplifier 84 and input to the pump light source drive circuit 85. The pump light source drive circuit 85 includes, for example, a power transistor, and conducts a current corresponding to the output of the amplifier 84 to drive the light source 71. Then the light source 71 outputs light of a power corresponding to the current supplied by the pump light source drive circuit 85 as the pump light.

Thus, the control circuit 72 controls the power of the light emitted by the light source 71 to correspond to the number of channels that are transmitting signals.

Figure 16:
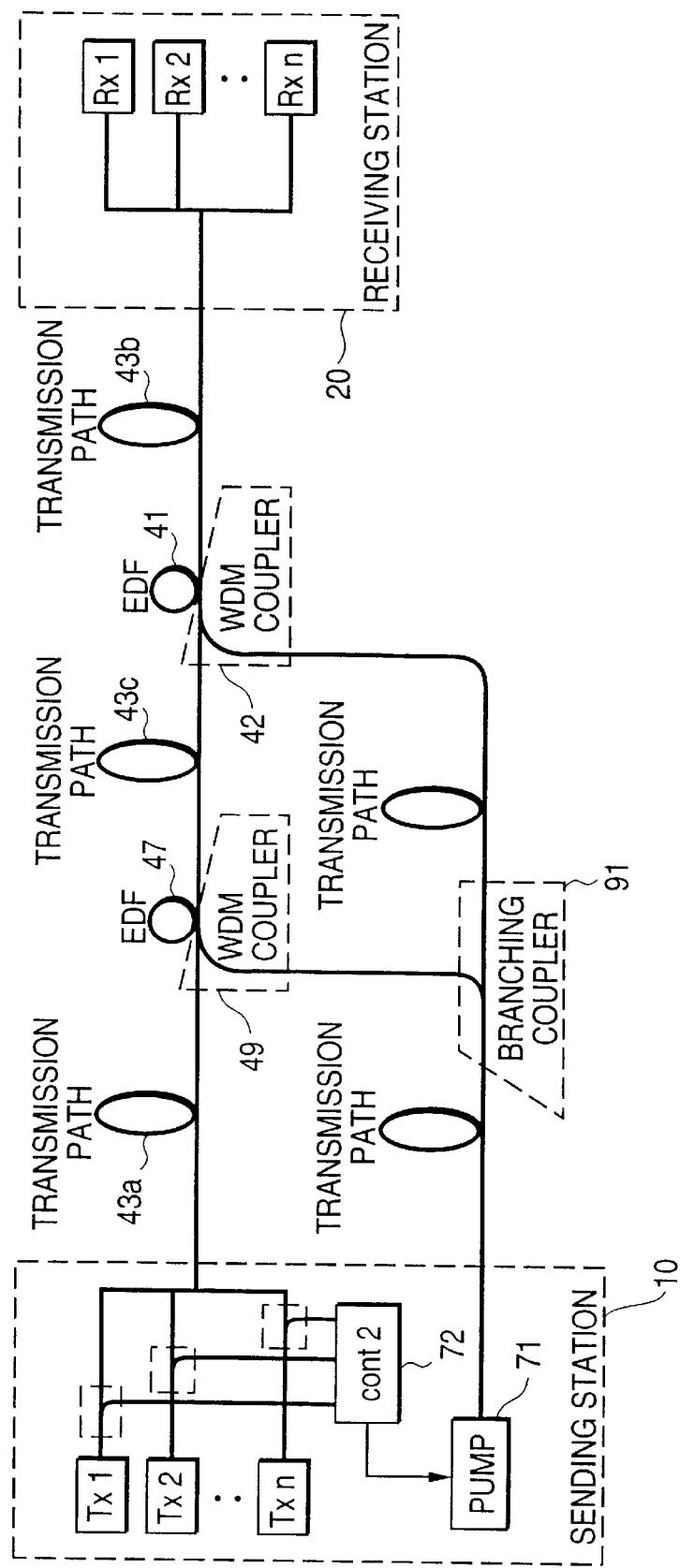
FIG. 16 is a configuration diagram of the transmission system of the 6th embodiment.

FIG. 16 is a configuration diagram of the transmission system of the 6th embodiment. In the system of the 5th embodiment shown in FIG. 14, one erbium-doped optical fiber (EDF 47) is installed on the transmission path between the sending station 10 and the receiving station 20, but in the system of the 6th embodiment, there are two erbium-doped optical fibers (EDF 41 and EDF 47). In the system of the 6th embodiment, the pump light generated by the light source 71 is branched using the branching coupler 91, and the resulting branches of the pump light are fed to EDF 41 and EDF 47, respectively. Thus, in the system of the 6th embodiment, the gains of a plurality of erbium-doped optical fibers are adjusted simultaneously.

Figure 17:
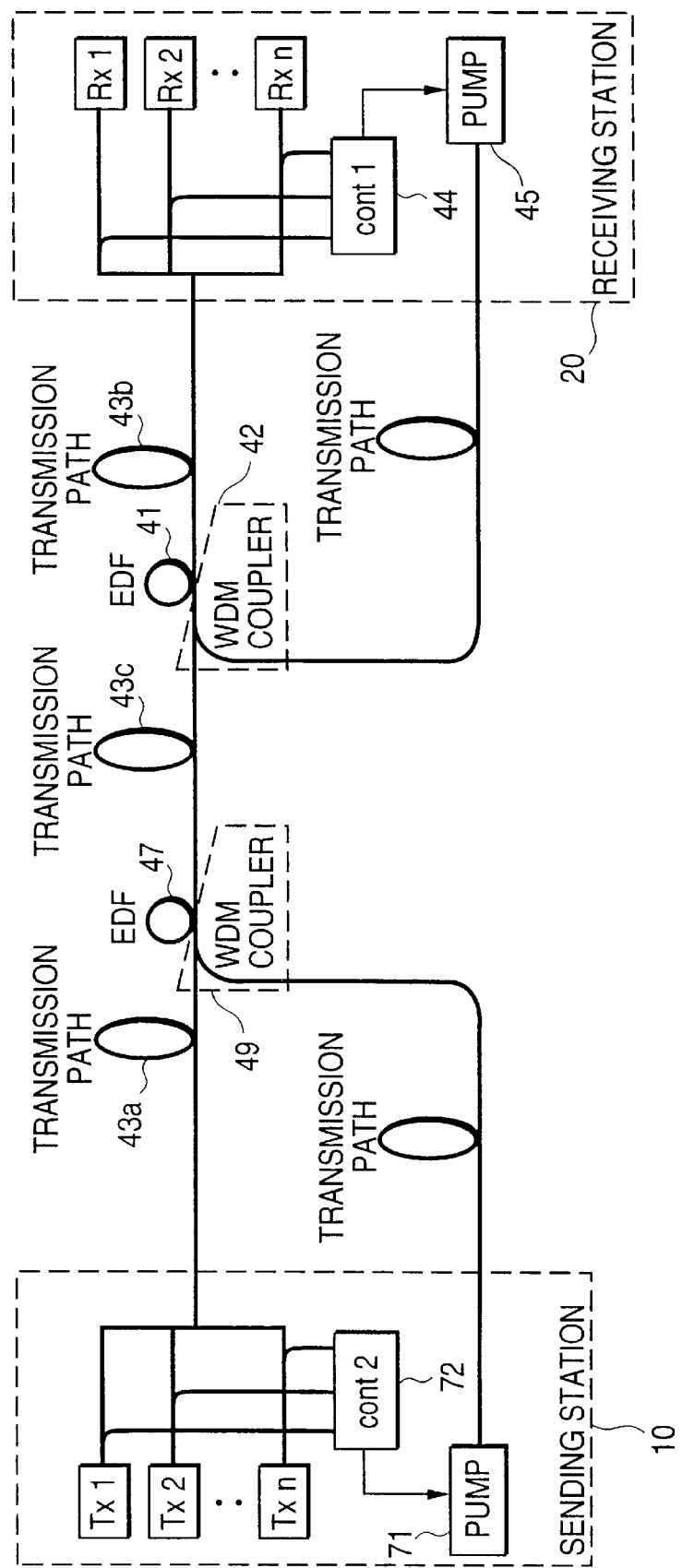
FIG. 17 is a configuration diagram of the transmission system of the 7th embodiment.

FIG. 17 is a configuration diagram of the transmission system of the 7th embodiment. The system of the 7th embodiment is a combination of the 1st embodiment shown in FIG. 6 and the 5th embodiment shown in FIG. 14. That is to say, pump light that is adjusted to correspond to the number of channels on which signals are being transmitted is fed to EDF 47 installed on the sending station side, and pump light that is adjusted to minimize the deviations of the light levels among the channels is fed to EDF 47 installed on the receiving station side.

Figure 18:
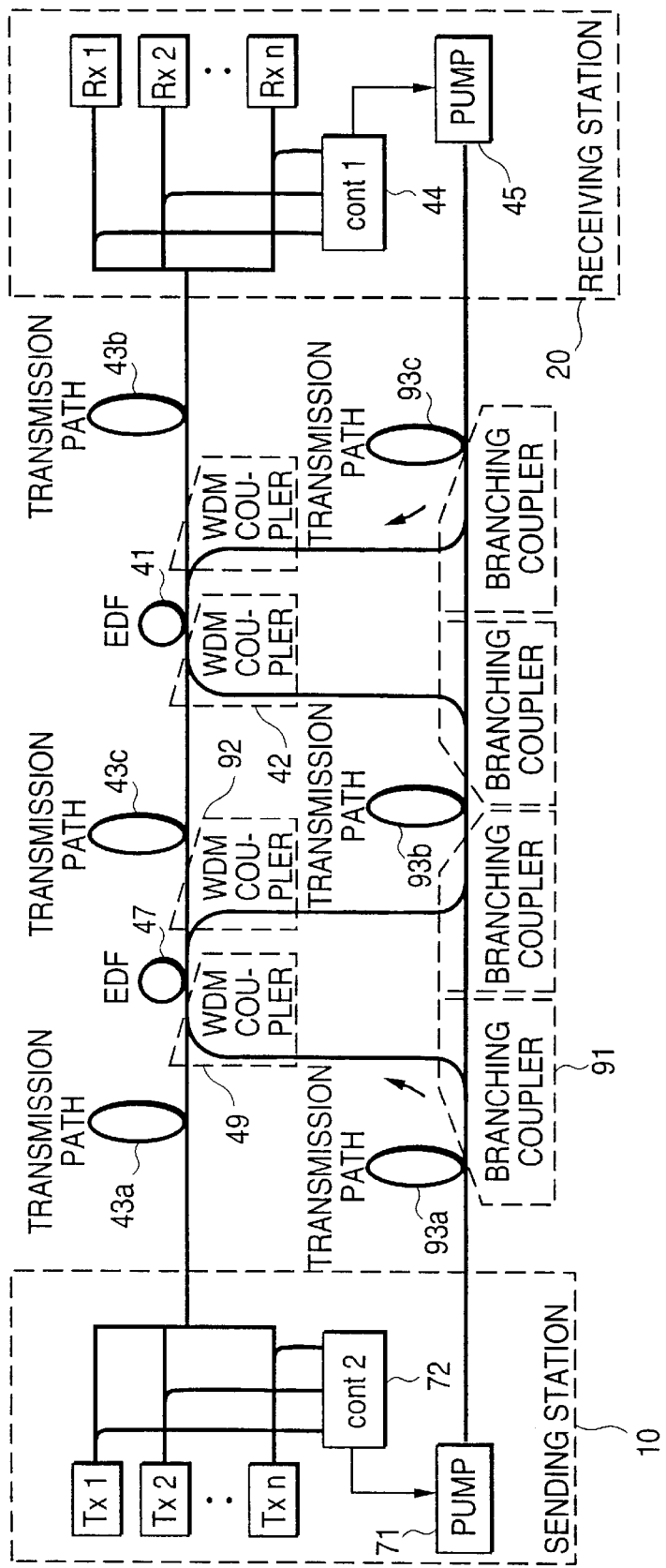
FIG. 18 is a configuration diagram of the transmission system of the 8th embodiment.

FIG. 18 is a configuration diagram of the transmission system of the 8th embodiment. The system of the 8th embodiment is a variation of the system of the 7th embodiment shown in FIG. 17. That is to say, in the transmission system of the 8th embodiment, the transmission paths of the multi-wavelength light (the signal light) and the pump light are separated, and a bidirectional pump configuration is adopted.

Figure 19:
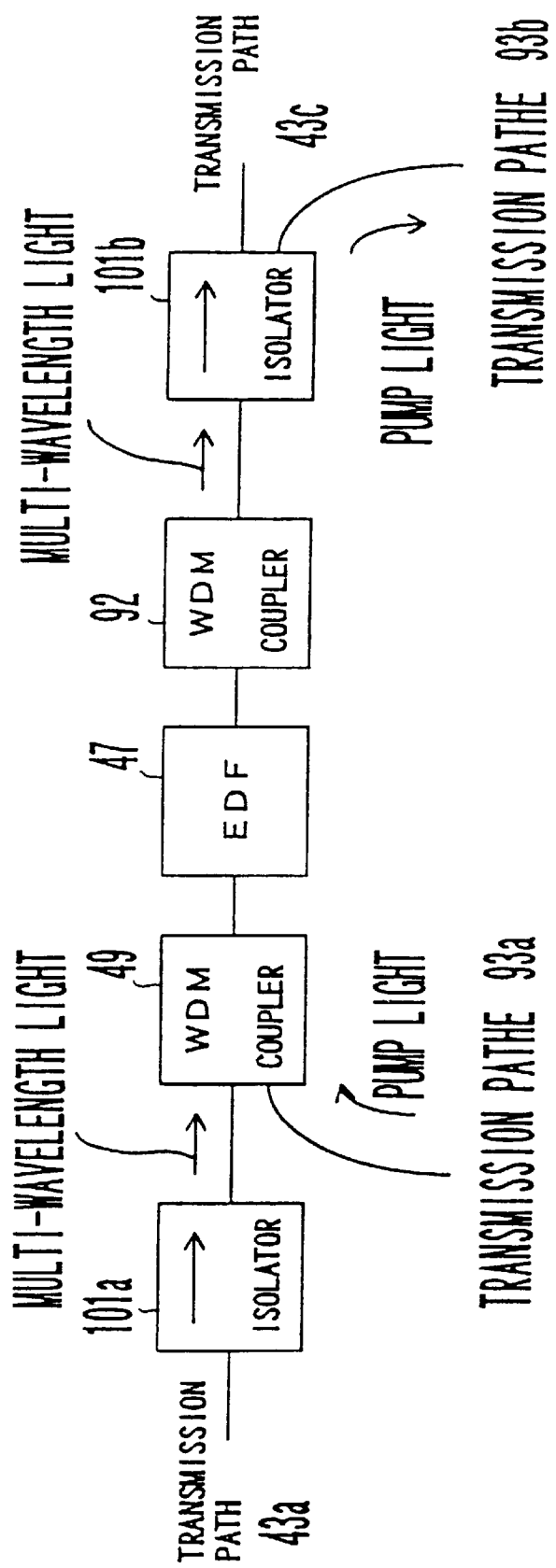
FIG. 19 is a diagram showing the configuration of the optical amplification section installed in the optical isolator.

The pump light that is output from the light source 71 is branched by the branching coupler 91 and fed to EDF 41 and EDF 47 as forward pump light. At this time, if part of the pump light fed to EDF 47 from the light source 71 passes through EDF 47 without being consumed in it, then, as shown in FIG. 19, the pump light that has passed through EDF 47 (the residual pump light) is split from the multi-wavelength light by the WDM coupler 92 and fed to the transmission path 93b. The pump light split off by the WDM coupler 92 is transmitted on transmission path 93b and fed to EDF 41. Consequently, only the multi-wavelength light is fed to transmission path 43c.

Meanwhile, the pump light output from the light source 45 is fed to EDF 41 and EDF 47, similarly to the pump light output from the light source 71. However, whereas the pump light output from the light source 71 is supplied as forward pump light, the pump light output from the light source 45 is supplied as backward pump light.

In the configuration described above, the residual pump light that passes through the 1st erbium-doped optical fiber without being consumed can be used as pump light by the 2nd erbium-doped optical fiber, increasing the efficiency of use of the pump light.

In addition, in the configuration described above, the proportions of pump light supplied by the light source 45 and the light source 71 can be predetermined. For example, in the case of a system in which the minimum number of channels being used is determined to be "m", the power of the light emitted by the light source 45 is set so that the multi-wavelength light consisting of multiplexed signals from m channels can be amplified to a specified level by only the pump light from the light source 45. Then, when the number of multiplexed channels being used increases, the light source 71 is set to emit enough pump light to correspond to the added channels.

The following is the reason why the transmission path of the multi-wavelength light between EDF 41 and EDF 47 (the transmission path 43c) is separated from the transmission path of the pump light (the transmission path 93b).

If an attempt is made to increase the efficiency of use of the pump light as described above, without separating the transmission path of the multi-wavelength light from the transmission path of the pump light, then, in the system shown in FIG. 18, the WDM couplers 42 and 92 and the transmission path 93b are eliminated. In this kind of configuration, the residual pump light that has been output from the light source 71 and passed through EDF 47 is fee to EDF 41 via the transmission path 43c. Similarly, the residual pump light that has been output from the light source 45 and passed through EDF 41 is fed to EDF 47 via the transmission path 43c.

However, in a light transmission system, optical isolators are sometimes installed before and after the optical amplifiers for the purpose of preventing reflections. FIG. 19 shows an example in which the optical isolators 101a and 101b are installed before and after EDF 47. When optical isolators are installed in this manner, the residual pump light that has been output from the light source 45 and been transmitted via the transmission path 43c is cut off by the optical isolator 101b, and is not supplied to EDF 47. The reason for separating the transmission path used for the multi-wavelength light from the transmission path used for the pump light between EDF 41 and EDF 47 is to permit pump to take place in both directions while preventing reflections. When the transmission path used for the multi-wavelength light is separated from the transmission path used for the pump light, particularly in a system that has three or more optical amplifiers, it becomes easy to control the pump light for each optical amplifier.

Figure 20:
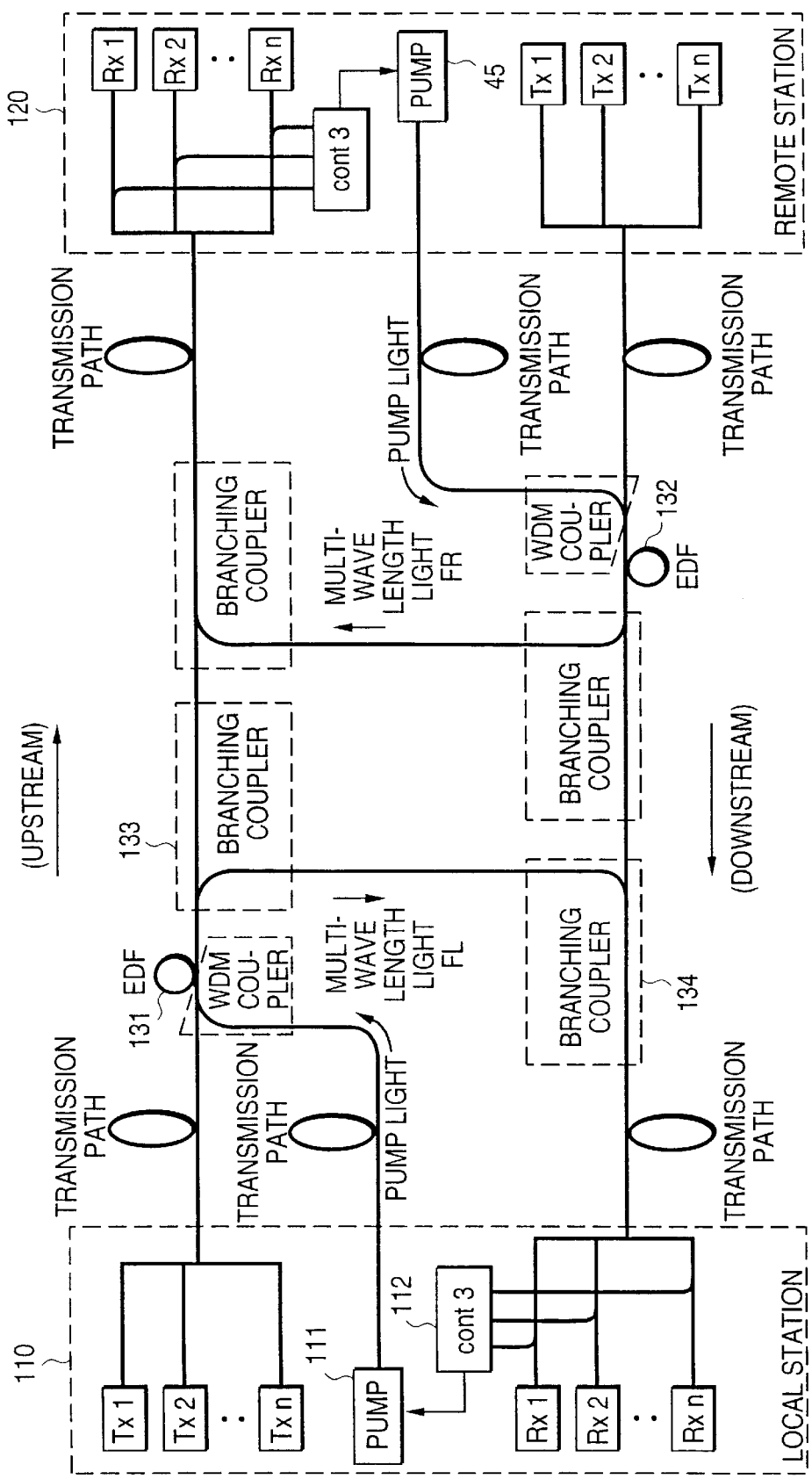
FIG. 20 is a configuration diagram of the transmission system of the 9th embodiment.

FIG. 20 is a configuration diagram of the transmission system of the 9th embodiment. The system of the 9th embodiment assumes that the configuration is such that the multi-wavelength light as the signal light is transmitted between a local station and a remote station in both directions. Here, the transmission path from the local station to the remote station is called the "upstream transmission path", and the transmission path from the remote station to the local station is called the "downstream transmission path".

In the transmission system of the 9th embodiment, part of the multi-wavelength light that is output from the local station and amplified by an erbium-doped optical fiber (EDF 131) is fed to the downstream transmission path that transmits multi-wavelength light from the remote station to the local station; part of this amplified multi-wavelength light is received by the local station. Then the local station adjusts the power of the pump light that is supplied to the erbium-doped optical fiber (EDF 131) that is installed on the upstream transmission path so as to minimize the deviations among the light levels on the channels which are multiplexed on the multi-wavelength light that has been output from the local station and then amplified by the EDF 131. In addition, the power of the pump light that is supplied to the erbium-doped optical fiber (EDF 132) that is installed on the downstream transmission path is similarly adjusted.

The details of this process will now be explained. Here we explain the upstream transmission path. The multi-wavelength light that is output from the local station will be called the "multi-wavelength light (FL)", and the multi-wavelength light that is output from the remote station will be called the "multi-wavelength light (FR)".

The multi-wavelength light (FL) that is output from the local station 110 is amplified by EDF 131 and transmitted to the remote station 120. Pump light generated by the light source 111 installed in the remote station 110 is supplied to EDF 131. The multi-wavelength light (FL) that is amplified by EDF 131 is branched by the branching coupler 133; the portion of the multi-wavelength light (FL) that is branched off is fed to the branching coupler 134 that is installed on the downstream transmission path. The branching coupler 134 synthesizes the multi-wavelength light (FR) output from the remote station 120 and the multi-wavelength light (FL) branched off by the branching coupler 133 and feeds the synthesized light to the downstream transmission path. Consequently, the local station 110 receives multi-wavelength light that is a synthesis of the multi-wavelength light (FR) and the multi-wavelength light (FL).

When the local station 110 receives the multi-wavelength light that is a synthesis of the multi-wavelength light (FR) and the multi-wavelength light (FL), that multi-wavelength light is split into its component wavelengths using a optical demultiplexer as was explained with reference to FIG. 7. Then each wavelength component of the signal light is branched by its respective branching coupler and the branched-off light is fed to the control circuit (cont3) 112. The action of the control circuit 112 is basically the same as that of the control circuit 44. That is to say, the power of the light emitted by the light source 111 is adjusted so as to minimize the deviations among the light levels on the channels which are multiplexed on the received multi-wavelength light.

The wavelengths of the channels used for the upstream transmission path and the downstream transmission path can be different from one another. That is to say, among the wavelengths $\lambda 1$ to $\lambda n$ that are used as the multi-wavelength light, the wavelengths $\lambda 1$, $\lambda 3$, $\lambda 5$, ..., might, for example be used for the multi-wavelength light (FL) transmitted via the upstream transmission path, while the wavelengths $\lambda 2$, $\lambda 4$, $\lambda 6$, ..., are used for the multi-wavelength light (FR) transmitted via the downstream transmission path. In this configuration, when the multi-wavelength light that is a synthesis of the multi-wavelength light (FL) and the multi-wavelength light (FR) is input to the local station 110, it is possible for only the signal light containing the wavelengths $\lambda 1$, $\lambda 3$, $\lambda 5$, ..., to be extracted from that multi-wavelength light and fed to the control circuit 112. That is to say, it is possible for only the signal light corresponding to the channels which are multiplexed on the multi-wavelength light (FL) to be input to the control circuit 112. In this case, the control circuit 112 adjusts the power of the light emitted from the light source 111 so as to equalize the channels which are multiplexed on the multi-wavelength light (FL) without being affected by the multi-wavelength light (FR) that is output from the remote station 120.

Figure 21:
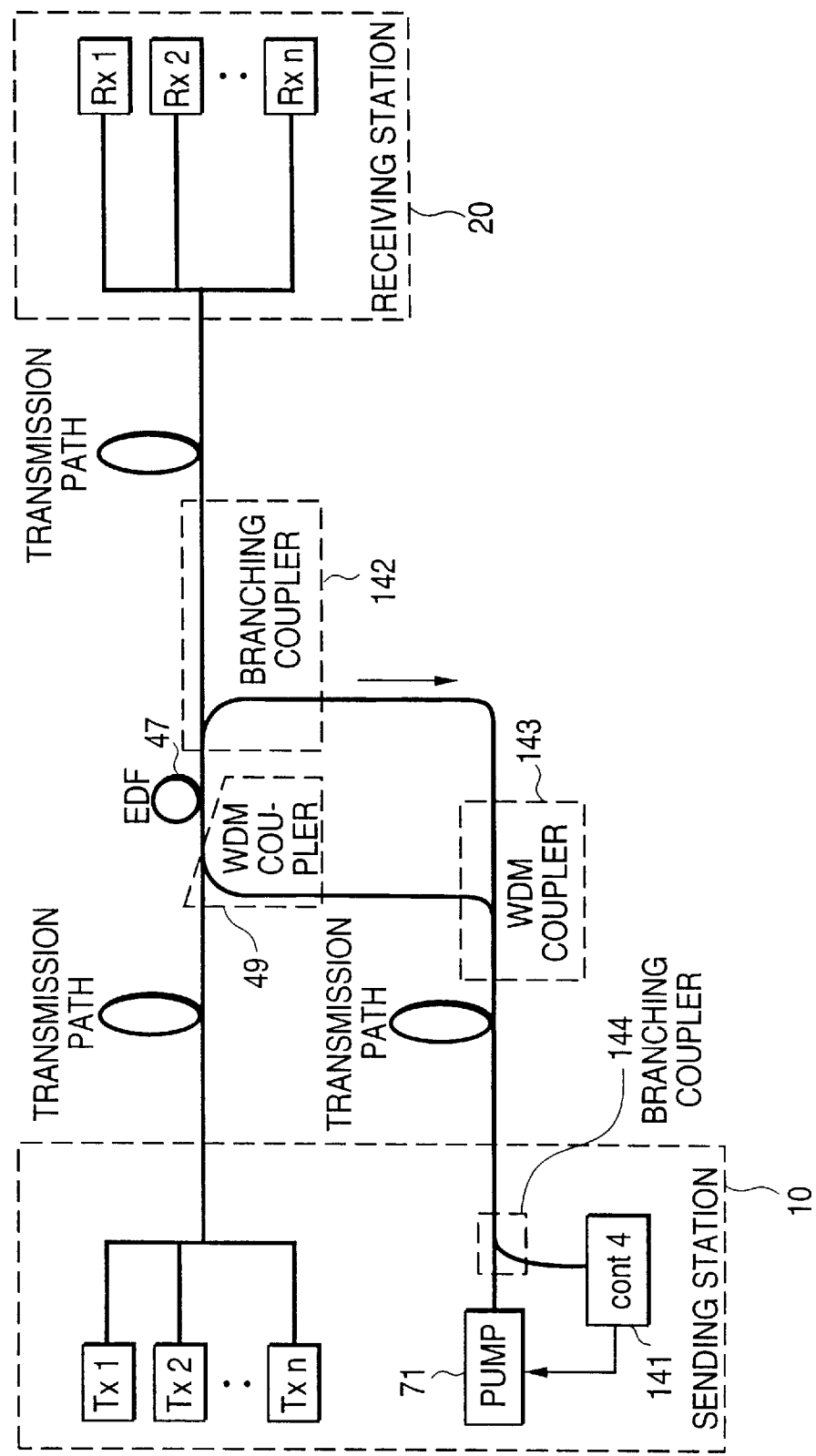
FIG. 21 is a configuration diagram of the transmission system of the 10th embodiment.

FIG. 21 is a configuration diagram of the transmission system of the 10th embodiment. In the system of the 10th embodiment, part of the multi-wavelength light that is output from the sending station and amplified by the optical amplifier is sent back to the sending station, and the pump light power is adjusted based on analysis of the multi-wavelength light that is received.

The multi-wavelength light that is output from the sending station 10 is amplified by EDF 47 and transmitted to the receiving station 20. Pump light generated by the light source 71 installed in the sending station 10 is supplied to EDF 47. The multi-wavelength light that has been amplified by EDF 47 is branched by the branching coupler 142; one portion of that branched multi-wavelength light is guided by the WDM coupler 143 and sent back to the sending station 10. The path via which part of the multi-wavelength light is sent back to the sending station 10 can, as shown in FIG. 21, be the same as the transmission path used to supply pump light, or a separate transmission path can be installed for the purpose.

The multi-wavelength light that is sent back to the sending station 10 is guided to the control circuit (cont4) 141 by the branching coupler 144. The control circuit 141 has the same function as the optical demultiplexer shown in FIG. 2 and FIG. 7; signal light corresponding to each channel is extracted by splitting the received multi-wavelength light into its wavelength components. Then the control circuit 141 adjusts the power of the light emitted by the light source 71 to minimize the deviations among the light levels on the plurality of channels which are multiplexed on that multi-wavelength light.

Figure 22:
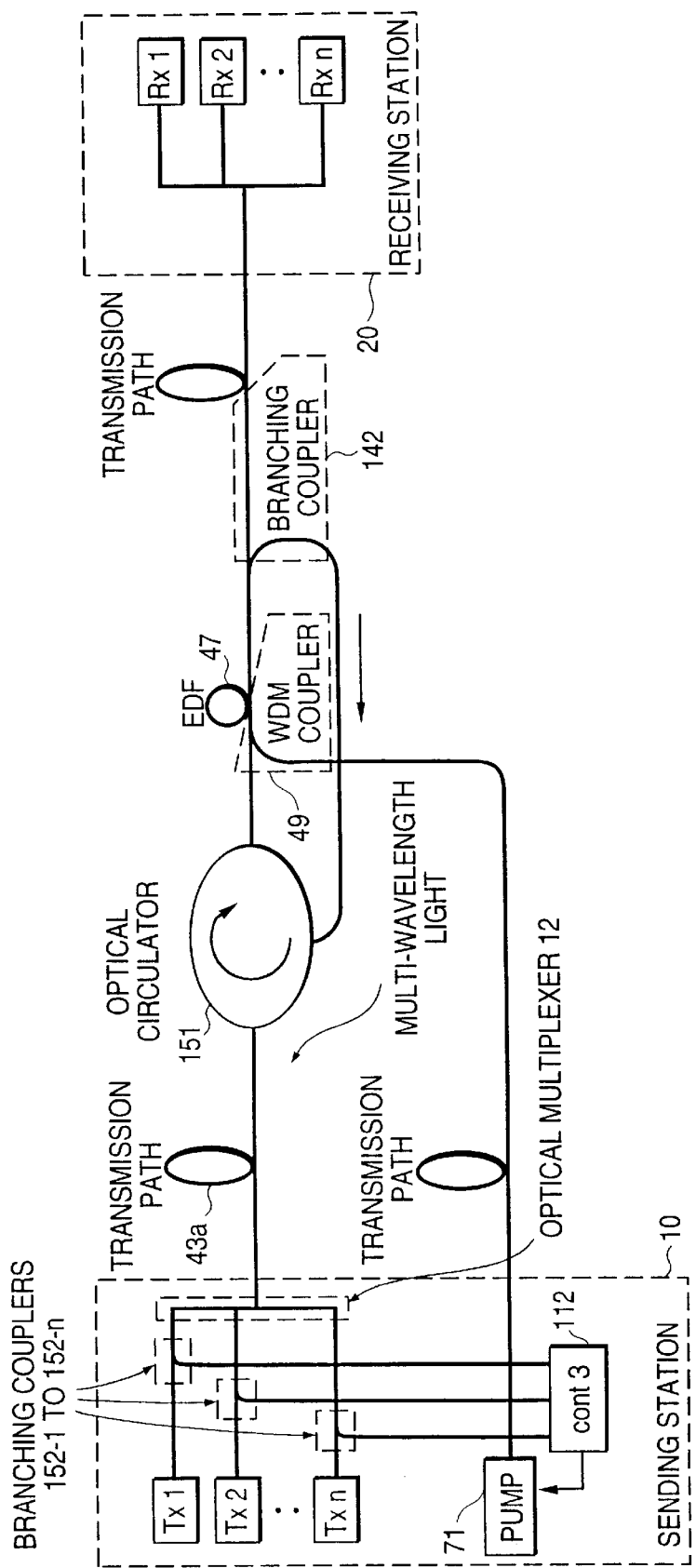
FIG. 22 is a configuration diagram of the transmission system of the 11th embodiment.

FIG. 22 is a configuration diagram of the transmission system of the 11th embodiment. As in the system of the 10th embodiment, part of the multi-wavelength light that has been output from the sending station and amplified by the optical amplifier is sent back to the receiving station, and the pump light power is adjusted based on analysis of the multi-wavelength light that is received there. However, whereas in the system of the 10th embodiment multi-wavelength light is sent back to the sending station via the same transmission path by which pump light is supplied, in the system of the 11th embodiment part of that multi-wavelength light is sent back to the sending station via the transmission path along which multi-wavelength light is transmitted to the receiving station.

The multi-wavelength light that is output from the sending station 10 passes through the light circulator 151, then is amplified by EDF 47 and transmitted to the receiving station 20. Pump light generated by the light source 71 installed in the sending station 10 is supplied to EDF 47. The multi-wavelength light that has been amplified by EDF 47 is branched by the branching coupler 142, then a portion of that branched multi-wavelength light is guided to the transmission path 43a by the optical circulator 151. This multi-wavelength light is transmitted via the transmission path 43a and input to the sending station 10.

The multi-wavelength light that is sent back to the sending station 10 is split into the signal light corresponding to each channel by being passed through the optical multiplexer 12 in the reverse direction. Then that signal light corresponding to each channel is input to the branching couplers 152-1 to 152-n, respectively, and guided to the control circuit 112. The control circuit 112 adjusts the power of the light emitted by the light source 71 so as to minimize the deviations among the light levels on the different channels.

Figure 23:
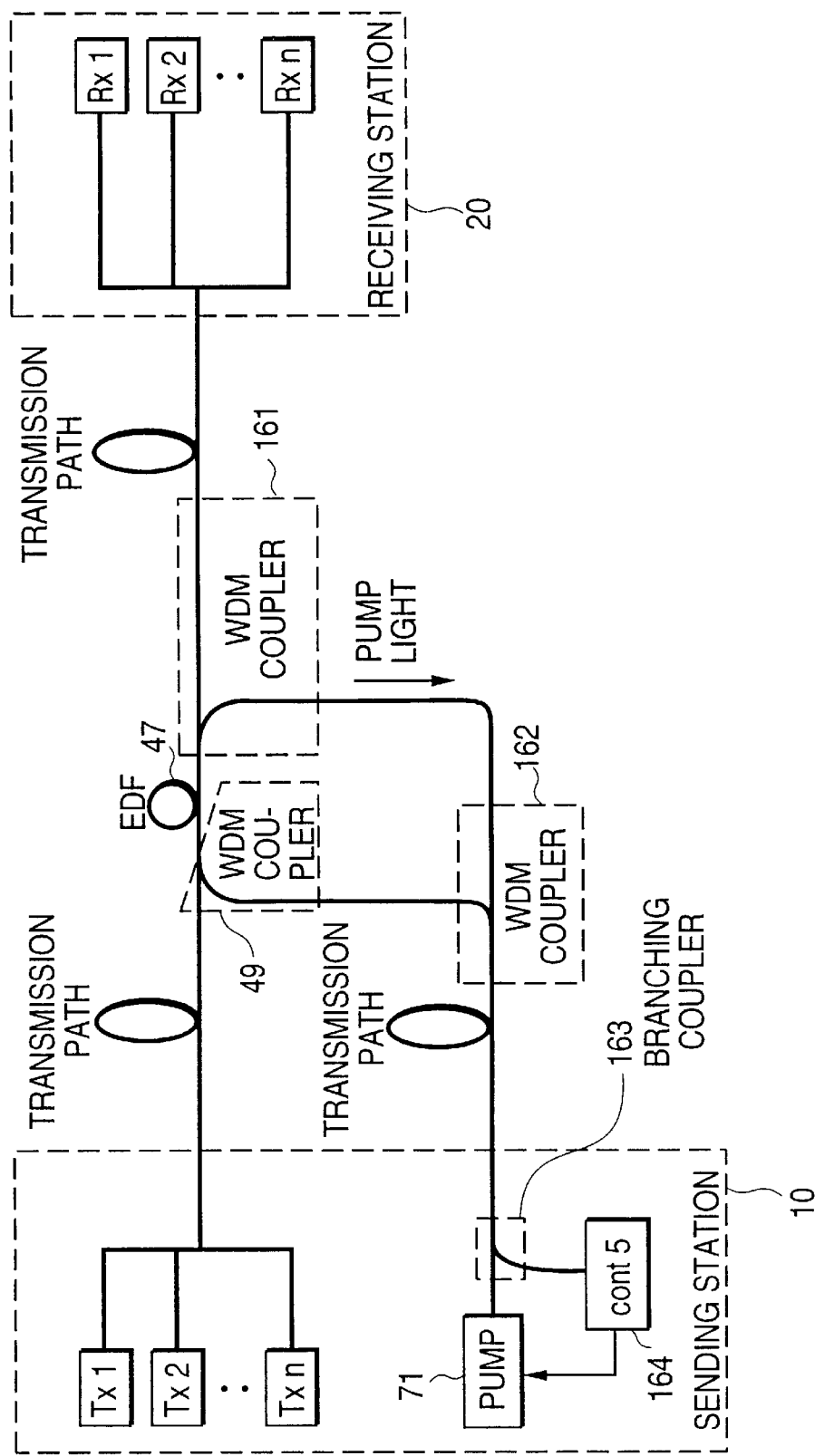
FIG. 23 is a configuration diagram of the transmission system of the 12th embodiment.

FIG. 23 is a configuration diagram of the transmission system of the 12th embodiment. The system of the 12th embodiment adjusts the deviations of the light levels on the different channels which are multiplexed on that multi-wavelength light based on the power of the residual pump light that has passed through an erbium-doped optical fiber that amplifies multi-wavelength light. If the length of the transmission path and the gain characteristics of the erbium-doped optical fiber that amplifies multi-wavelength light are known, then the deviations of the light levels on the plurality of channels which are multiplexed on the multi-wavelength light can be estimated based on the power of the pump light that is supplied to that erbium-doped optical fiber and the power of the residual pump light that has passed through that erbium-doped optical fiber without being consumed. The transmission system of the 12th embodiment uses this characteristic.

The multi-wavelength light that is output from the sending station 10 is amplified by EDF 47 and transmitted to the receiving station 20. Pump light generated by the light source 71 installed in the sending station 10 is supplied to EDF 47. Residual pump light that has passed through EDF 47 is split from the multi-wavelength light by the WDM coupler 161. This residual pump light is guided to the sending station 10 by the branching coupler 162.

Residual pump light that has been sent back to the sending station 10 is guided to the control circuit (cont5) 164 by the branching coupler 163. The control circuit 164 estimates the deviations among the light levels on the plurality of channels which are multiplexed on the multi-wavelength light based on the power of this residual pump light and the light emitted by the light source 71, and adjusts the power of the light emitted by the light source 71 to minimize the deviations among the light levels on those channels in accordance with the result of that estimate.

Figure 24:
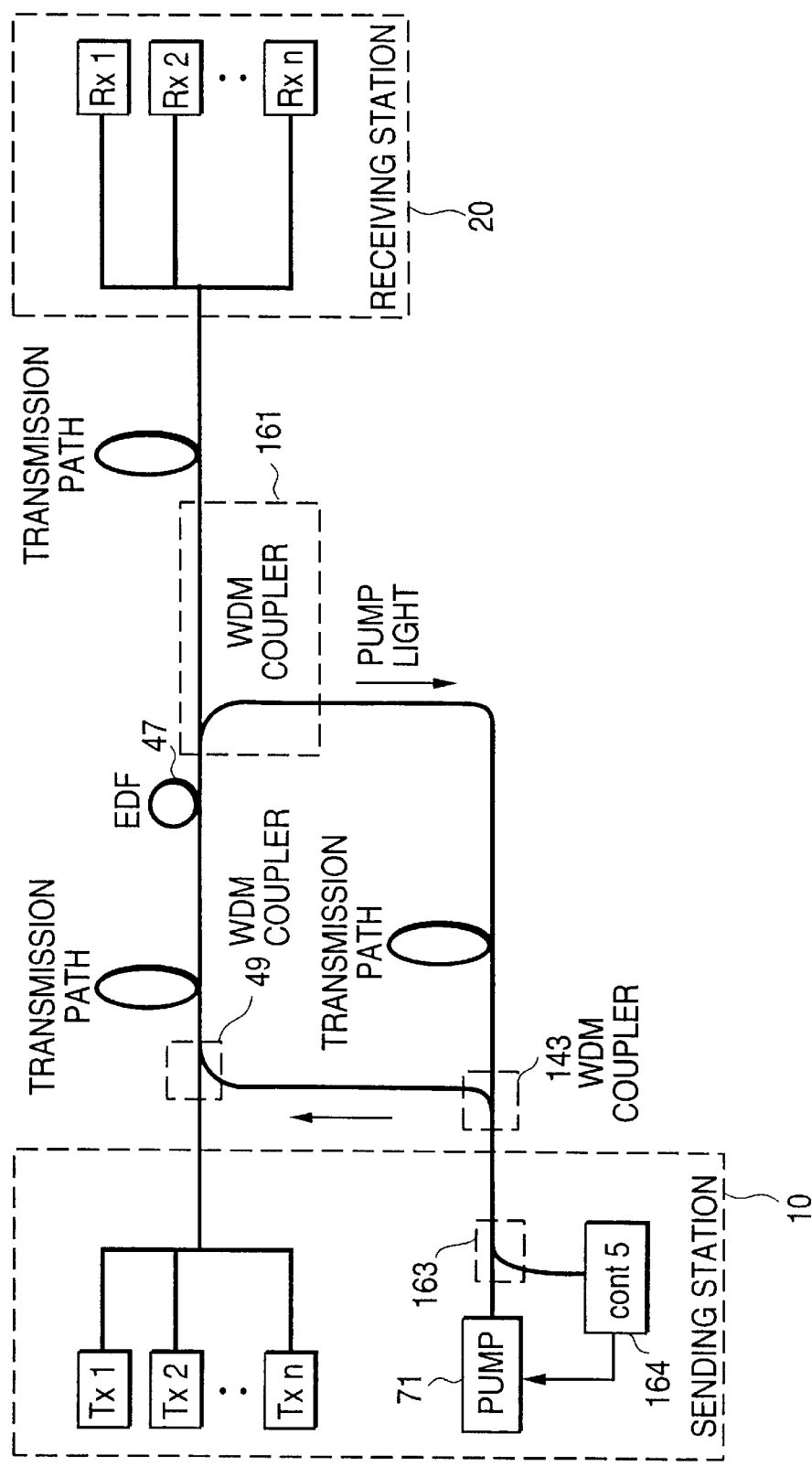
FIG. 24 is a configuration diagram showing a variation of the transmission system of the 12th embodiment.

FIG. 24 is a configuration diagram of a variation of the transmission system of the 12th embodiment. In the system shown in FIG. 24, the positions in which the WDM couplers 49 and 143 are installed are different from their positions in the transmission system of the 12th embodiment.

Figure 25:
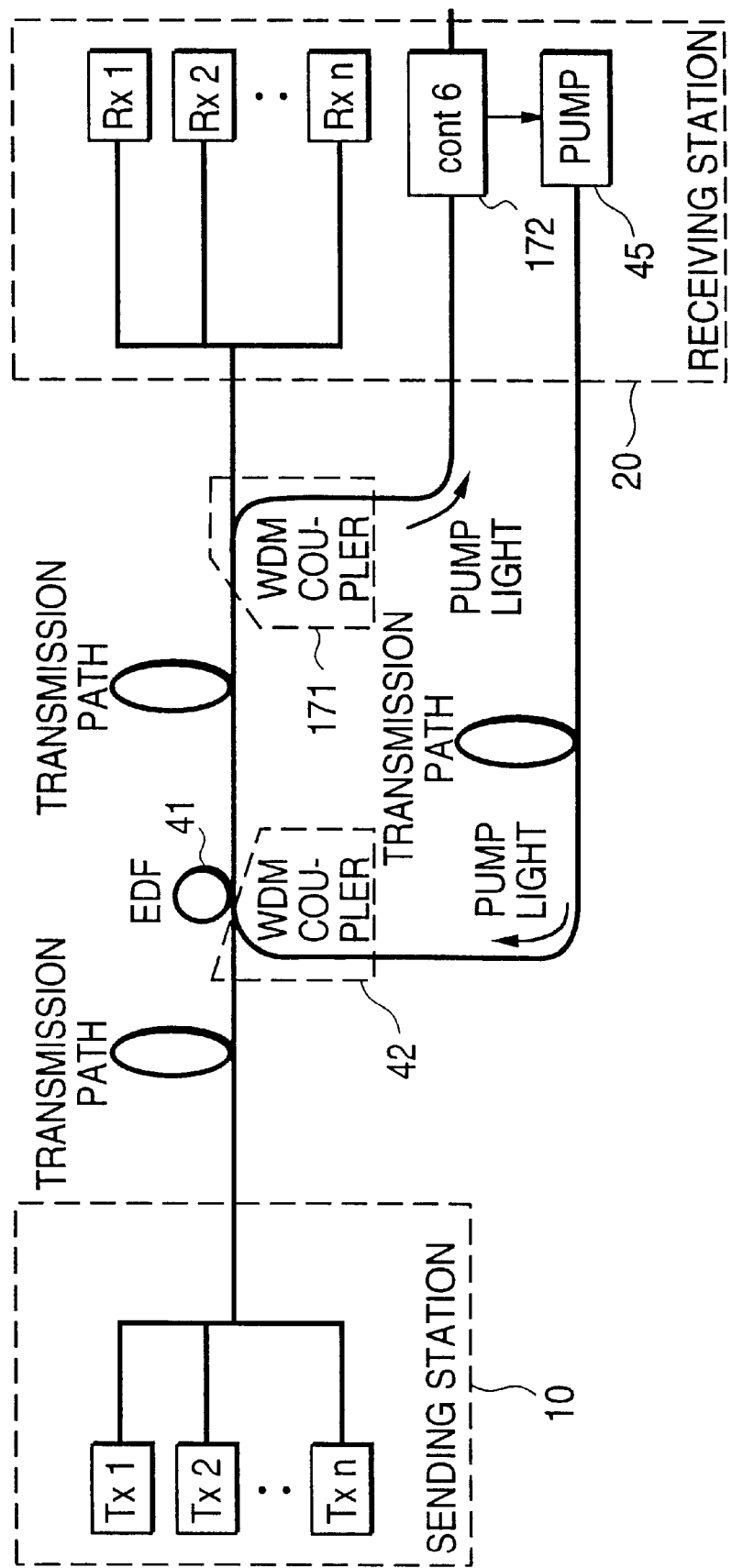
FIG. 25 is a configuration diagram of the transmission system of the 13th embodiment.

FIG. 25 is a configuration diagram of the transmission system of the 13th embodiment. Like the system of the 12th embodiment, the system of the 13th embodiment adjusts the deviations among the light levels on the plurality of channels which are multiplexed on the multi-wavelength light based on the power of the residual pump light that has passed through the erbium-doped optical fiber that amplifies that multi-wavelength light. However, whereas in the system of the 12th embodiment it is the pump light that is generated on the sending station side that is adjusted, in the system of the 13th embodiment it is the pump light that is generated on the receiving station side that is adjusted.

The multi-wavelength light that is output from the sending station 10 is amplified by EDF 41 and transmitted to the receiving station 20. Pump light generated by the light source 45 installed in the receiving station 20 is supplied to EDF 41. The residual pump light that has passed through EDF 41 is split from the multi-wavelength light by the WDM coupler 171 and guided to the control circuit (cont6) 172. The action of the control circuit 172 is basically the same as that of the control circuit 164 shown in FIG. 23. The deviations among the light levels on the plurality of channels which are multiplexed on the multi-wavelength light are estimated based on the power of the residual pump light that is received and the light emitted by the light source 45. Then the power of the light source 45 is adjusted to minimize the deviations among the light levels on the various channels based on the results of those estimates.

Figure 26:
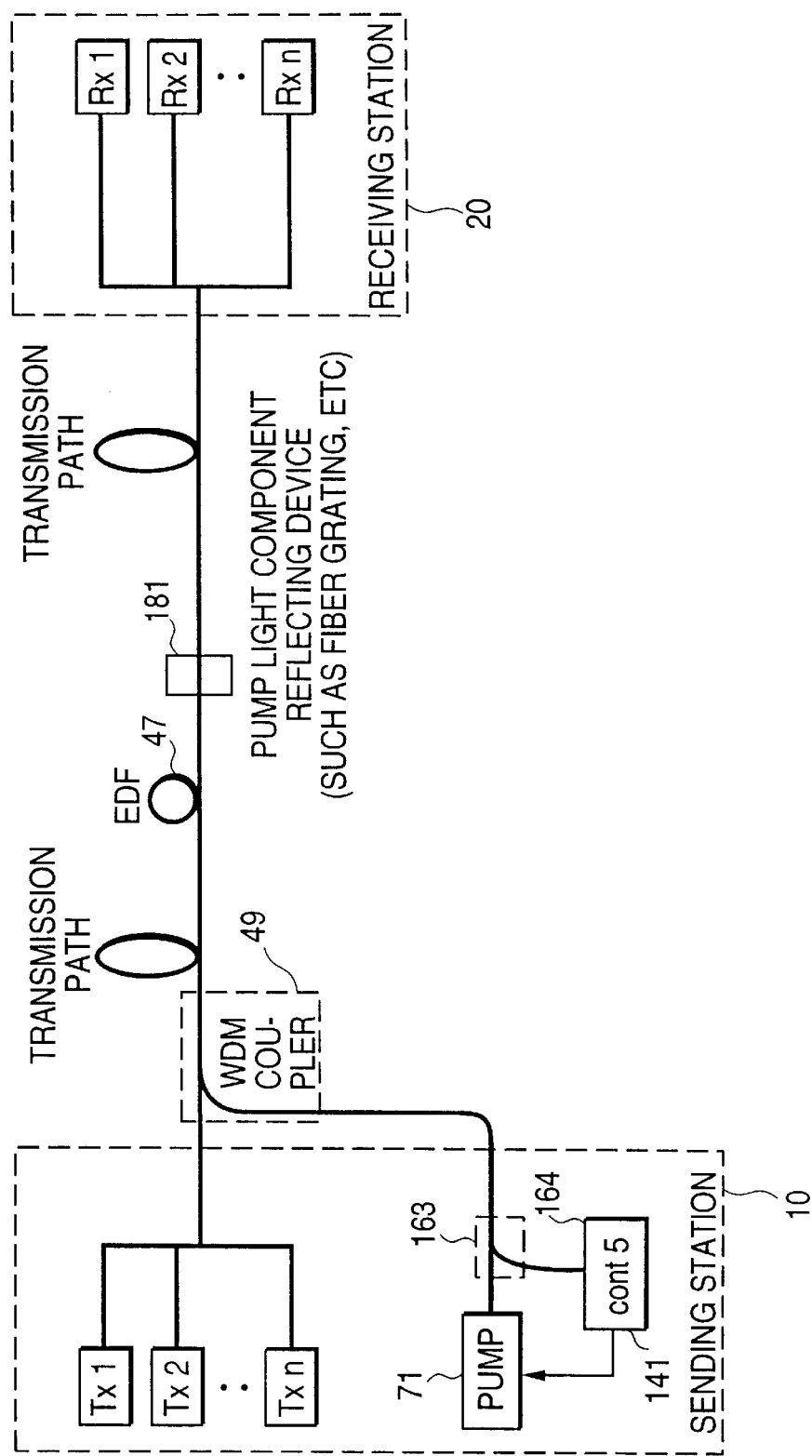
FIG. 26 is a configuration diagram of the transmission system of the 14th embodiment.

FIG. 26 is a configuration diagram of the transmission system of the 14th embodiment. The system of the 14th embodiment, like the system of the 12th embodiment, adjusts the deviations among the light levels on the plurality of channels which are multiplexed on the multi-wavelength light based on the power of the residual pump light that has passed through the erbium-doped optical fiber that amplifies that multi-wavelength light. However, whereas in the system of the 12th embodiment the residual pump light is sent back to the sending station using a WDM coupler, in the system of the 14th embodiment a reflection device is used to send the residual pump light back to the sending station.

The multi-wavelength light that is output from the sending station 10 is amplified by EDF 47, then transmitted to the receiving station 20 through the reflection device 181. Pump light generated by the light source 71 that is installed in the sending station 10 is supplied to EDF 47.

The reflecting device 181 consists of, for example, a fiber grating; it reflects only the wavelength of the pump light (in this example, 1480 nm) and passes other wavelength components. Consequently, the multi-wavelength light that is output from the sending station 10 passes through this reflecting device 181, but the residual pump light that has passed through EDF 47 is reflected by this reflecting device 181. The residual pump light that is reflected is guided to the control circuit 164 by the WDM coupler 49 and the branching coupler 163. As explained above, the control circuit 164 estimates the deviations among the light levels on the plurality of channels which are multiplexed on the multi-wavelength light based on the power of the received residual pump light and of the light that is emitted by the light source 45, and adjusts the power of the light emitted by the light source 45 so as to minimize the deviations among the light levels on those channels in accordance with the results of those estimates.

Methods of supplying pump light to an erbium-doped optical fiber include the forward pump method in which the pump light is supplied in the same direction as the direction in which the signal light is transmitted and the backward pump method in which the pump light is supplied in the opposite direction to the direction in which the signal light is transmitted. This invention is not limited to either of these directions in any of the embodiments.

When pump light is supplied to an erbium-doped optical fiber, in many embodiments, a WDM coupler installed immediately before or immediately after the erbium-doped optical fiber is used to merge the pump light onto the same transmission path that is used for the signal light, but it is also possible to synthesize the signal light and the pump light into one optical fiber in the sending station or the receiving station and then transmit the synthesized light to the erbium-doped optical fiber. When the signal light and the pump light are synthesized and then the synthesized light is transmitted, it is possible that the noise will become large, but this method is less expensive because a separate transmission path to transmit the pump light is not necessary.

In the examples shown by the various embodiments described above, the light source that generates the pump light and the circuit that controls that pump light are installed within the sending station or the receiving station, but this light source and control circuit could also be installed outside of the sending station or the receiving station. However, even if the light source and the control circuit are installed outside of the sending station or the receiving station, considering convenience of maintenance it is desirable for them to be installed near the sending station or the receiving station.

In the various embodiments described above, an erbium-doped optical fiber is used to amplify the multi-wavelength light, but this invention can use a wide variety of optical fiber amplifiers including rare earth-doped optical fibers. In addition, the amplifiers used in this invention need not even be limited to optical fiber amplifiers. A wide variety of optical amplifiers of which the gain can be remotely controlled, for example semiconductor optical amplifiers, can also be used.

Also, in the various embodiments described above, the gain of an erbium-doped optical fiber is controlled by controlling the power of the pump light, but it is also possible to control the gain of an erbium-doped optical fiber by adjusting the light level of the signal light that is amplified by that erbium-doped optical fiber. In this case, a light level controller (for example, an optical attenuator) is installed immediately before the erbium-doped optical fiber; that light level controller is remotely controlled.

Further, in the various embodiments described above, the light levels on the various channels are equalized, but it is also possible for the light levels on the various channels to be made to have a specified characteristics. For example, it is possible to amplify the light so that the light level of the amplified light increases as the wavelength becomes longer.

According to this invention, in a system which is a system that transmits multi-wavelength light and is configured so that the optical amplification unit that amplifies that multi-wavelength light is remotely controlled, the results of analysis of that multi-wavelength light are used to adjust the pump light that is supplied to the optical amplification unit, so it is possible to minimize the deviations among the levels on the plurality of channels which are multiplexed on that multi-wavelength light. In addition, in the system that is configured so that the optical amplification unit is remotely controlled, the pump light that is supplied to that optical amplification unit is adjusted corresponding to the number of multiplexed channels, so that the multi-wavelength light noise can be suppressed.

What is claimed is:

1. A multi-wavelength light transmission system in which an optical amplification medium is installed on the transmission path through which multi-wavelength light is transmitted between a sending station and a receiving station, comprising:

a light source installed within the sending station or near the sending station;

a detector, installed within the sending station or near the sending station, detecting a number of multiplexed wavelengths in the multi-wavelength light; and a control circuit adjusting the power of the light emitted by said light source corresponding to the number of multiplexed wavelengths detected by said detector, wherein said sending station comprises:
a plurality of transmitters outputting a plurality of optical signals to form the multi-wavelength light, respectively, having corresponding, mutually different wavelengths, and
a splitting device splitting the plurality of optical signals and guiding the split optical signals to said detector, said detector detecting the number of multiplexed wavelengths based on the optical signals from said splitting device.

2. A multi-wavelength light transmission system, in which a plurality of optical amplification media are installed on a transmission path that transmits multi-wavelength light between a sending station and a receiving station, comprising:

a first light source, installed within or near the sending station, generating pump light;

a detector, installed within or near the sending station, detecting a number of multiplexed wavelengths in the multi-wavelength light;

a first control circuit, installed within or near the sending station, adjusting the power of the light emitted by said first light source in accordance with the number of multiplexed wavelengths detected by said detector;

a second light source, installed within or near the receiving station, generating pump light;

a second control circuit, installed within or near the receiving station, adjusting the power of the light emitted by said second light source and thereby adjusting light levels on a plurality of channels which are multiplexed on the multi-wavelength light; and the pump light generated by said first and second light sources excites at least one of the plurality of optical amplification media, wherein said detector detects a number of channels to be multiplexed in the multi-wavelength light, prior to the plurality of channels being multiplexed in the multi-wavelength light.

3. The multi-wavelength light transmission system according to claim 2, wherein:

said second light source generates pump light corresponding to a specified number of multiplexed wavelengths; and said first control circuit adjusts the power of the light emitted by said first light source when the number of multiplexed wavelengths changes.

4. A multi-wavelength light transmission system as recited in claim 2, wherein the transmission path comprises:

a first transmission path portion connecting the sending station with the optical amplification medium;

a second transmission path portion connecting the receiving station with the optical amplification medium; and a pump light transmission path receiving the pump light output of the light source and transmitting same to the optical amplification medium.

5. A multi-wavelength light transmission system, comprising:

a transmission path transmitting a wavelength division multiplexed (WDM) light between a sending station and a receiving station;

a detector, installed within the sending station or near the sending station, detecting a number of channels in the WDM light, said sending station comprising:

a plurality of transmitters outputting a plurality of optical signals to form WDM light, and a splitting device splitting the plurality of optical signals and guiding the split optical signals to said detector, said detector detecting the number of channels based on the optical signals from said splitting device; and a controller controlling pump light provided to a downstream optical amplifier in accordance with the detected number of channels.

6. An apparatus comprising:

a transmitting station transmitting a wavelength division multiplexed (WDM) light to a receiving station through an optical transmission line, the WDM light including a plurality of channels wavelength division multiplexed together;

a detector detecting the number of channels in the WDM light before the channels are multiplexed together, and producing a corresponding detection signal indicating the detected number of channels;

a pump light source providing pump light to an optical amplifier located along the transmission line downstream of the transmitter and which amplifies the WDM light in accordance with the provided pump light; and a controller receiving the detection signal and controlling power of the pump light in accordance with the number of channels indicated by the detection signal, wherein the detection signal is transmitted from the detector to the controller without traveling through the transmission line.

7. An apparatus as in claim 6, wherein the detector is located in the transmitting station.

8. An apparatus as in claim 6, wherein the controller is located in the transmitting station.

9. An apparatus as in claim 6, wherein the pump light source is located in the transmitting station.

10. An apparatus as in claim 6, wherein the detector and the controller are both located in the transmitting station.

11. An apparatus as in claim 6, wherein the pump light source, the detector and the controller are located in the transmitting station.

12. A multi-wavelength light transmission system, as recited in claim 4, wherein:

said optical amplification media comprises first and second optical amplification sub media and a third transmission path connected therebetween; and the pump light transmission path further comprises a branching coupler and first and second branched transmission paths, the pump light energy being divided by the branching coupler and supplied to the first and second optical amplification sub media, respectively.

13. A multi-wavelength light transmission system according to claim 1, wherein:

said detector detects the number of channels prior to the plurality of channels being multiplexed in the multi-wavelength light.

* * * * *